US007683504B2

(12) United States Patent
Blair et al.

(10) Patent No.: US 7,683,504 B2
(45) Date of Patent: Mar. 23, 2010

(54) MULTIPLE LOCATION ELECTRONIC TIMER SYSTEM

(75) Inventors: Edward J. Blair, Telford, PA (US); Aaron Dobbins, Hopedale, MA (US); Nicole R. Vigue, Niagara Falls, NY (US); Kyle A. McCarter, Washington, DC (US); Robert C. Newman, Jr., Emmaus, PA (US); Elliot G. Jacoby, Glenside, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 49 days.

(21) Appl. No.: 11/943,846

(22) Filed: Nov. 21, 2007

(65) Prior Publication Data

US 2008/0265685 A1 Oct. 30, 2008

Related U.S. Application Data

(63) Continuation-in-part of application No. 11/521,234, filed on Sep. 13, 2006, now Pat. No. 7,579,717.

(60) Provisional application No. 60/860,759, filed on Nov. 22, 2006.

(51) Int. Cl.
*H01H 7/00* (2006.01)
(52) U.S. Cl. ...................................... 307/141
(58) Field of Classification Search .................. 307/141
See application file for complete search history.

(56) References Cited

U.S. PATENT DOCUMENTS

| 3,939,361 | A | 2/1976 | Aidala et al. |
|---|---|---|---|
| 4,015,139 | A | 3/1977 | Cleary et al. |
| 4,082,961 | A | 4/1978 | Genuit |
| 4,204,149 | A | 5/1980 | Cleary et al. |
| RE30,295 | E | 6/1980 | Cleary et al. |
| 4,259,618 | A | 3/1981 | Nilssen |
| 4,322,632 | A | 3/1982 | Hart et al. |
| 4,336,464 | A | 6/1982 | Weber |

(Continued)

FOREIGN PATENT DOCUMENTS

DE 4002597 A1 8/1991

(Continued)

OTHER PUBLICATIONS

European Patent Office, International Search Report and Written Opinion for PCT Application No. PCT/US2007/078354, Mar. 31, 2008, 11 pages.

(Continued)

*Primary Examiner*—Robert L. Deberadinis
(74) *Attorney, Agent, or Firm*—Mark E. Rose; Philip N. Smith

(57) ABSTRACT

A multiple location electronic timer system comprises an electronic timer and one or more accessory timers. The electronic timer is adapted to be coupled between an AC power source and an electrical load. The electronic timer is operable to enable the delivery of power to the load and to subsequently discontinue the delivery of power to the load automatically after a preset timeout period has elapsed. In response to controls signals received from the accessory timer, the electronic timer is operable to adjust the preset timeout period, enable the delivery of power to the load, discontinue the delivery of power to the load, and to enter a bypass mode in which the load is turned on for an indefinite amount of time. The accessory timer may be coupled to the electronic timer via a single conductor, a wired digital communication link, a radio frequency communication link, an infrared communication link, or a power line carrier communication link.

62 Claims, 15 Drawing Sheets

U.S. PATENT DOCUMENTS

| | | | |
|---|---|---|---|
| 4,338,562 A | 7/1982 | Terwilliger | |
| 4,360,739 A | 11/1982 | Goldstein | |
| 4,382,192 A | 5/1983 | Mendelson | |
| 4,389,599 A | 6/1983 | Jabor | |
| 4,413,211 A | 11/1983 | Fowler | |
| 4,422,018 A | 12/1983 | Bailey | |
| 4,425,532 A | 1/1984 | Sinkauz | |
| 4,480,197 A | 10/1984 | Hollaway | |
| 4,494,012 A | 1/1985 | Coker | |
| 4,500,795 A | 2/1985 | Hochstein et al. | |
| 4,540,984 A | 9/1985 | Waldman | |
| 4,591,781 A | 5/1986 | Larson | |
| 4,649,323 A | 3/1987 | Pearlman et al. | |
| 4,695,739 A | 9/1987 | Pierce | |
| 4,896,079 A | 1/1990 | Tabor | |
| 4,924,109 A | 5/1990 | Weber | |
| 5,005,211 A | 4/1991 | Yuhasz | |
| 5,030,890 A | 7/1991 | Johnson | |
| 5,051,607 A | 9/1991 | Dalton | |
| 5,160,853 A | 11/1992 | Simon et al. | |
| 5,237,264 A | 8/1993 | Moseley et al. | |
| 5,248,919 A | 9/1993 | Hanna et al. | |
| 5,319,283 A | 6/1994 | Elwell | |
| 5,399,940 A | 3/1995 | Hanna et al. | |
| 5,473,204 A | 12/1995 | Temple | |
| 5,488,273 A | 1/1996 | Chang | |
| RE35,220 E | 4/1996 | Johnson | |
| 5,511,943 A | 4/1996 | Chang | |
| 5,559,406 A | 9/1996 | Chang | |
| 5,715,214 A | 2/1998 | Svarnias | |
| 5,798,581 A | 8/1998 | Keagy et al. | |
| 5,798,620 A | 8/1998 | Wacyk et al. | |
| 5,808,423 A | 9/1998 | Li et al. | |
| 5,838,226 A | 11/1998 | Houggy et al. | |
| 5,905,442 A | 5/1999 | Mosebrook et al. | |
| 5,909,087 A | 6/1999 | Bryde et al. | |
| 6,107,758 A | 8/2000 | Fischer et al. | |
| 6,121,889 A | 9/2000 | Janda et al. | |
| 6,169,377 B1 | 1/2001 | Bryde et al. | |
| 6,300,727 B1 | 10/2001 | Bryde et al. | |
| 6,313,588 B1 | 11/2001 | Mosebrook et al. | |
| 6,346,781 B1 | 2/2002 | Mosebrook et al. | |
| 6,380,696 B1 | 4/2002 | Sembhi et al. | |
| 6,545,434 B2 | 4/2003 | Sembhi et al. | |
| 6,572,338 B2 | 6/2003 | Janisse et al. | |
| 6,670,725 B2 * | 12/2003 | Fitzgibbon et al. | 307/66 |
| 6,803,728 B2 | 10/2004 | Balasubramaniam et al. | |
| 6,927,547 B2 | 8/2005 | Walko, Jr. et al. | |
| 7,026,729 B2 | 4/2006 | Homan et al. | |
| 7,190,125 B2 | 3/2007 | McDonough et al. | |
| 7,247,999 B2 | 7/2007 | Kumar | |
| 2003/0057880 A1 | 3/2003 | Hudson | |
| 2004/0206609 A1 | 10/2004 | Tilley | |
| 2005/0062442 A1 | 3/2005 | Lu | |
| 2005/0063200 A1 | 3/2005 | Lu | |
| 2005/0094493 A1 | 5/2005 | Walko, Jr. | |
| 2005/0242753 A1 | 11/2005 | Morrison et al. | |
| 2005/0280598 A1 | 12/2005 | Webb et al. | |
| 2006/0273775 A1 | 12/2006 | Dobbins et al. | |
| 2006/0273970 A1 | 12/2006 | Mosebrook et al. | |
| 2006/0284734 A1 | 12/2006 | Newman, Jr. | |
| 2007/0007826 A1 | 1/2007 | Mosebrook et al. | |
| 2008/0061633 A1 | 3/2008 | Blair et al. | |

FOREIGN PATENT DOCUMENTS

| | | |
|---|---|---|
| GB | 2133232 A | 7/1984 |

OTHER PUBLICATIONS

Lutron Electronics Co., Inc., "Introduction", Homeworks Technical Reference Guide Rev G, Feb. 2005, front cover, pp. 2-8, rear cover.
Leviton Manufacturing Co., Inc., "Timers", The Decora Collection of Designer Devices Catalog, 2001, front cover, pp. E13-E14, rear cover.
Intermatic Incorporated, Electronic Countdown Timers, 2004, 2 pages.
Intermatic Incorporated, In Wall Timers, 2003, 4 pages.
Intermatic Incorporated, EJ500C Product Fact Sheet, Aug. 1, 2004, 1 page.
Intermatic Incorporated, Easyset Programming the Intermatic EJ500C Timer, Feb. 24, 2006, 2 pages.
Smarthome, Inc., Insteon SwitchLinc Timer V2 User's Guide, 2005, 28 pages.
Smarthome, Inc., Insteon SwitchLinc Timer V2 Quick-Start Guide, 2005, 4 pages.
Crestron Electronics, Inc., Crestron SIMPL Windows Primer, 2003, front cover, inside front cover, pp. i-iii, 1-7, 37-66.
Crestron Electronics, Inc., Crestron SIMPL Windows Symbol Guide, Sep. 2002, front cover, inside front cover, pp. i-iv, 1, 182-188, rear cover.
U.S. Appl. No. 11/447,431, filed Jun. 6, 2006, Steiner et al.
U.S. Appl. No. 11/471,908, filed Jun. 20, 2006, Mosebrook et al.
U.S. Appl. No. 11/521,234, filed Sep. 13, 2006, Blair et al.
U.S. Appl. No. 11/559,166, filed Nov. 13, 2006, Spira.
Description of Intermatic E1210 Electronic In-Wall Countdown Timer, which was available to the public at least as early as 2004, 2 pages.

* cited by examiner

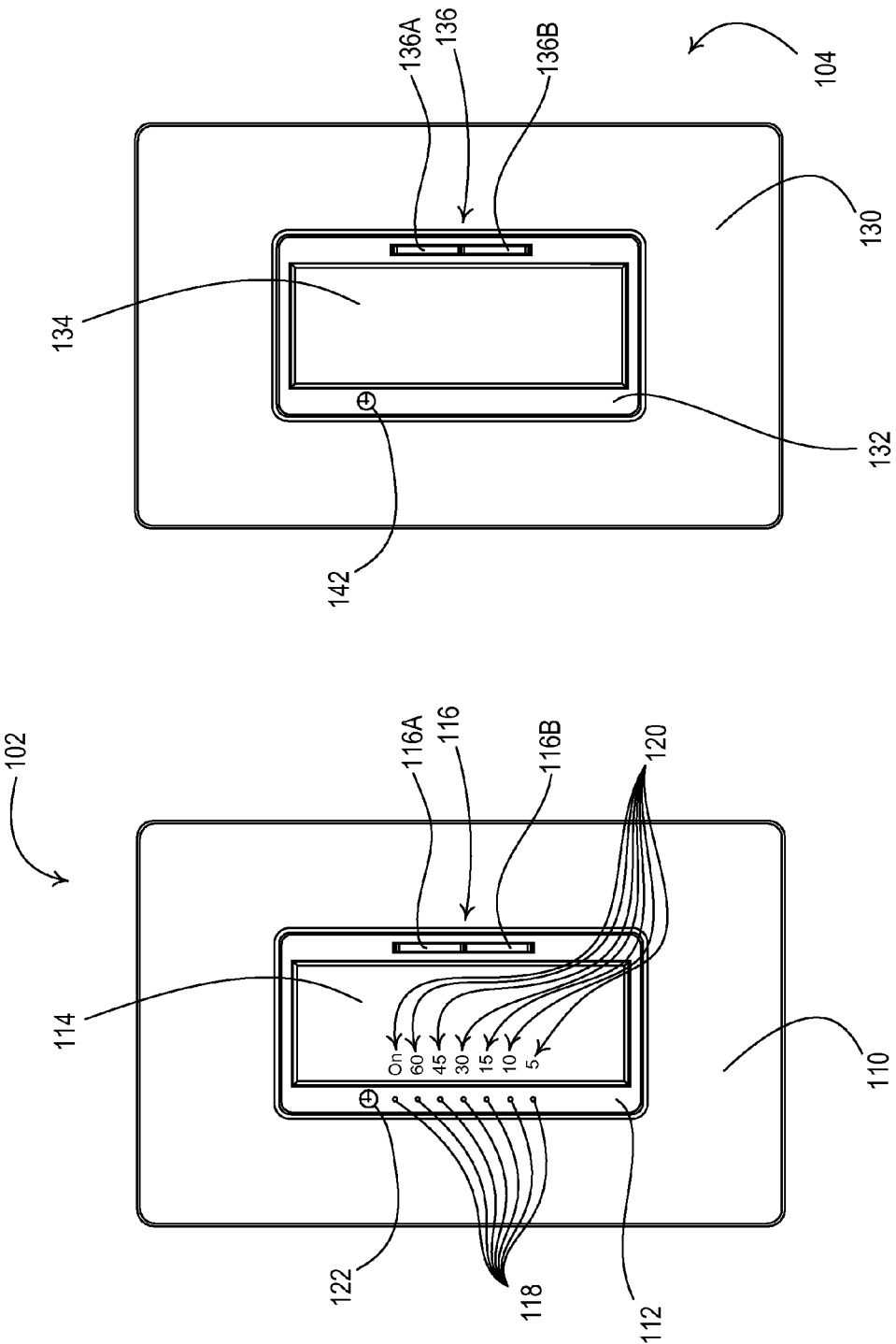

MULTIPLE LOCATION ELECTRONIC TIMER SYSTEM

RELATED APPLICATIONS

This application is a continuation-in-part of co-pending commonly-assigned U.S. patent application Ser. No. 11/521,234, filed Sep. 13, 2006, entitled WALL-MOUNTABLE TIMER FOR AN ELECTRICAL LOAD. This application also claims priority from commonly-assigned U.S. Provisional Patent Application Ser. No. 60/860,759, filed Nov. 22, 2006, entitled MULTIPLE LOCATION ELECTRONIC TIMER SYSTEM. The entire disclosures of both applications are hereby incorporated by reference.

BACKGROUND OF THE INVENTION

1. Field of the Invention

The present invention relates to load control devices for controlling the amount of power delivered to an electrical load from a source of alternating-current (AC) power, and more particularly, to a multi-location electronic timer system for supplying power to a connected electrical load for a predetermined amount of time selectable by a user.

2. Description of the Related Art

In response to increasing awareness of energy conservation, many lighting control devices, such as dimmers, electronic timers, occupancy sensors, and daylight sensors, provide means for energy management of lighting loads in commercial and residential installations. Specifically, electronic timers operate to turn off a connected electrical load after a predetermined amount of time after the electrical load is turned on. Typically, the electronic timer includes a switching device, such as a relay, coupled in series electrical connection between an AC power source and the electrical load. Often, electronic timers are adapted to be mounted in electrical wall-boxes and are used in rooms, such as bathrooms, where a light or an exhaust fan may be turned on when the room is first in use, and left on after the room is no longer in use.

Some prior art electronic timers are operable to be wired to a remote control for control of the electronic timer from a remote location. However, such remote electronic timers provide only limited functionality (i.e., a user is only able to turn on and off the connected lighting load from the remote control) and no feedback of the operation of the electronic timer. Thus, there is a need for a multiple location electronic timer system having a remote control that provides a simple, attractive user interface, is easy to use, and allows access to many features.

SUMMARY OF THE INVENTION

According to the present invention, a multiple location electronic timer system for controlling the power delivered to an electrical load from an AC power source comprises a wall-mountable electronic timer and a wall-mountable accessory timer. The electronic timer is adapted to be coupled in series electrical connection between the source and the load, and comprises an internal timer, a timer adjustment actuator, and a plurality of visual indicators. The electronic timer is operable to select a preset timeout period in response to an actuation of the timer adjustment actuator, cause the visual indicators to display a representation of the preset timeout period, enable the delivery of power to the load in response to a control signal received directly from the accessory timer, and start the internal timer in response to the control signal received from the accessory timer. The internal timer is initialized with the preset timeout period. The electronic timer is further operable to prevent the delivery of power to the load when the preset timeout period has elapsed.

According to a second embodiment of the present invention, a multiple location electronic timer system comprises an electronic timer and a wall-mountable accessory timer having a user interface adapted to receive user inputs. The electronic timer is adapted to be coupled in series electrical connection between an AC power source and an electrical load, such that the electronic timer is operable to enable the delivery of power to the load, and subsequently to prevent the delivery of power to the load automatically when a preset timeout period has elapsed. The electronic timer is operable to enable the delivery of power to the load in response to a first control signal received from the accessory timer, prevent the delivery of power to the load in response to a second control signal received from the accessory timer, and enter a bypass mode in response to a third control signal received from the accessory timer, whereby the load is turned on for an indefinite amount of time. According to a third embodiment of the present invention, the electronic timer is operable to change the preset timeout period in response to a control signal received directly from the accessory timer.

According to another embodiment of the present invention, a multiple location electronic timer system comprises a wall-mountable electronic timer having a plurality of visual indicators, and a wall-mountable accessory timer. The electronic timer is adapted to be coupled in series electrical connection between an AC power source and an electrical load, such that the electronic timer is operable to enable the delivery of power to the load, and subsequently to prevent the delivery of power to the load automatically when a preset timeout period has elapsed. The electronic timer is operable to control the power delivered to the load in response to a control signal received directly from the accessory timer. The visual indicators are operable to display a representation of the preset timeout period when the electronic timer is preventing the delivery of power to the load.

According to yet another embodiment of the present invention, a multiple location electronic timer system comprises an electronic timer and a wall-mountable accessory timer comprising a control actuator, a timer adjustment actuator, and a plurality of visual indicators. The electronic timer is adapted to be coupled in series electrical connection between an AC power source and an electrical load, the electronic timer comprising an internal timer. The electronic timer is operable to select a preset timeout period in response to an actuation of the timer adjustment actuator, cause the visual indicators to display a representation of the preset timeout period, enable the delivery of power to the load in response to an actuation of the control actuator, and start the internal timer in response to the actuation of the control actuator. The internal timer is initialized with the preset timeout period. The electronic timer is further operable to prevent the delivery of power to the load when the preset timeout period has elapsed.

The present invention further provides a wall-mountable load control device for controlling the power delivered to an electrical load from an AC power source. The load control device comprises a controllably conductive device, a controller operatively coupled to a control input of the controllably conductive device, a power supply coupled in parallel electrical connection with the controllably conductive device, and a communication circuit coupled to the controller. The controllably conductive device is adapted to be coupled in series electrical connection between the source and the load for controlling the delivery of power to the load. The controller is operable to control the conductivity of the controllably conductive device so as to enable the delivery of power to the load, and subsequently to control the conductivity of the controllably conductive device so as to prevent the delivery of power to the load automatically when a preset timeout period has elapsed. The power supply is operable to generate a DC voltage for powering the controller. The communication circuit is operable to receive a control signal and to control the conductivity of the controllably conductive device in response to the control signal. Preferably, the controller is operable to change the preset timeout period in response to the control signal. Further, the controller is operable to control the conductivity of the controllably conductive device so as to enable the delivery of power to the load in response to a first control signal, control the conductivity of the controllably conductive device so as to prevent the delivery of power to the load in response to a second control signal, and enter a bypass mode in response to a third control signal, whereby the load is turned on for an indefinite amount of time.

According to another embodiment of the present invention, a wall-mountable load control device for controlling the power delivered to an electrical load from an AC power source comprises: (1) a controllably conductive device adapted to be coupled in series electrical connection between the source and the load for controlling the delivery of power to the load; (2) a controller operatively coupled to a control input of the controllably conductive device, and operable to control the conductivity of the controllably conductive device so as to enable the delivery of power to the load, and subsequently control the conductivity of the controllably conductive device so as to prevent the delivery of power to the load when a preset timeout period has elapsed; and (3) a communication circuit coupled to the controller and operable to transmit a control signal representative of the preset timeout period.

In addition, the present invention provides a method of controlling the power delivered to an electrical load from an AC power source. The method comprises the steps of: (1) actuating a timer adjustment actuator; (2) transmitting a timer adjustment control signal in response to the step of actuating the timer adjustment actuator; (3) receiving the timer adjustment control signal; (4) electing a preset timeout period in response to the step of receiving the timer adjustment control signal; (5) enabling the delivery of power to the load; and (6) subsequently disabling the delivery of power to the load when the preset timeout period has elapsed.

The present invention further provides a method of controlling the power delivered to an electrical load from an AC power source comprising the steps of: (1) receiving a first control signal; (2) enabling the delivery of power to the load in response to the first control signal; (3) subsequently discontinuing the delivery of power to the load when a preset timeout period has elapsed; (4) receiving a second control signal; and (5) entering a bypass mode in response to the second control signal, whereby the load is turned on for an indefinite amount of time in the bypass mode.

Other features and advantages of the present invention will become apparent from the following description of the invention that refers to the accompanying drawings.

BRIEF DESCRIPTION OF THE DRAWINGS

FIG. 2A is a front view of the electronic timer of the timer system of FIG. 1;

FIG. 2B is a front view of the accessory timer of the timer system of FIG. 1;

DETAILED DESCRIPTION OF THE INVENTION

Figure 1:
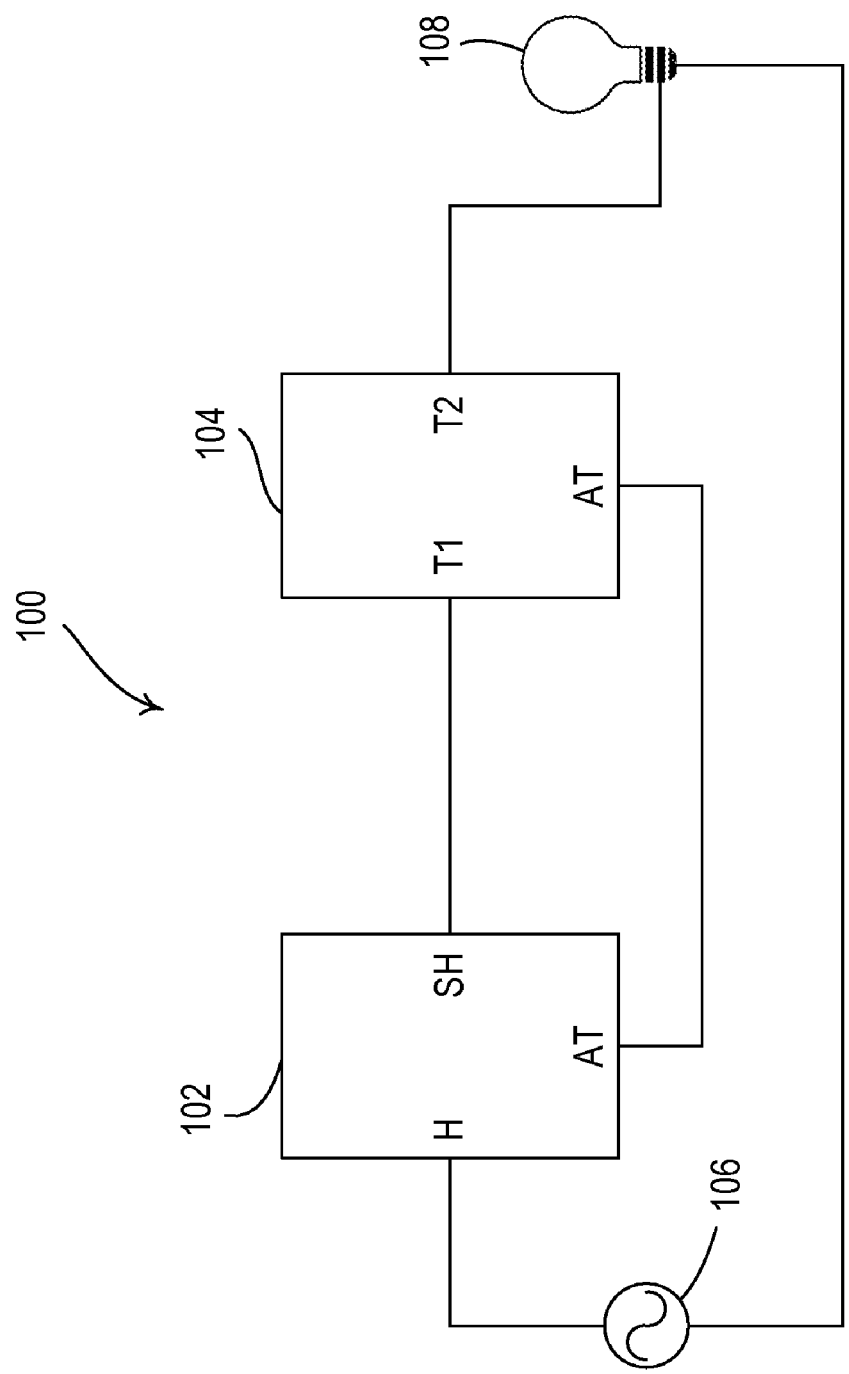
FIG. 1 is a simplified block diagram of a multiple location electronic timer system according to a first embodiment of the present invention.

The foregoing summary, as well as the following detailed description of the preferred embodiments, is better understood when read in conjunction with the appended drawings. For the purposes of illustrating the invention, there is shown in the drawings an embodiment that is presently preferred, in which like numerals represent similar parts throughout the several views of the drawings, it being understood, however, that the invention is not limited to the specific methods and instrumentalities disclosed.

FIG. 1 is a simplified block diagram of a multiple location electronic timer system 100 according to a first embodiment of the present invention. The timer system 100 comprises an electronic timer 102 and an accessory timer 104 (i.e., a plurality of timer control devices). The electronic timer 102 and the accessory timer 104 are both coupled in series between an alternating-current (AC) power source 106 and a connected electrical load, for example, a lighting load 108 or a motor load, such as an exhaust fan. The electronic timer 102 is coupled to the AC power source 106 via a hot terminal H and is coupled to the accessory timer 104 via a switched-hot terminal SH. The accessory timer 104 is coupled to the electronic timer 102 via a first terminal T1 and to the lighting load 108 via a second terminal T2, such that the accessory timer 104 is connected on the load side of the timer system 100 as shown in FIG. 1. Note that the accessory timer 104 could alternatively be coupled to the AC power source 106 such that the accessory timer 104 is coupled on the line side of the timer system 100.

The electronic timer 102 is operable to control the amount of power delivered to the lighting load 108 to turn on the lighting load and to subsequently automatically turn off the lighting load 108 after a predetermined amount of time, i.e., a preset timeout period, has elapsed. The accessory timer 104 is coupled to the electronic timer 102 via an accessory timer terminal AT, such that the electronic timer is responsive to control signals transmitted from the accessory timer. Accordingly, the accessory timer 104 is operable to turn on and off the lighting load 108 and to control the preset timeout period of the electronic timer 102. The operation of the electronic timer 102 is described in greater detail in the previously-referenced U.S. patent application Ser. No. 11/521,234.

FIGS. 2A and 2B are front views of the electronic timer 102 and the accessory timer 104 of the timer system 100. The electronic timer 102 and the accessory timer 104 comprise respective faceplates 110, 130 and bezels 112, 132 received in openings of the faceplates. The electronic timer 102 and the accessory timer 104 further comprise respective control actuators 114, 134 and timer adjustment actuators 116, 136 (i.e., rocker switches). Actuations of either of the control actuators 114, 134 toggle (i.e., turn off and on) the lighting load 108. Actuations of upper portions 116A, 136A of the timer adjustment actuators 116, 136 increase the preset timeout period of the electronic timer 102. Similarly, actuations of the lower portions 116B, 136B of the timer adjustment actuators 116, 136 decrease the preset timeout period. After turning the lighting load 108 on, the electronic timer 102 is operable to turn off the lighting load when the preset timeout period has elapsed. Alternatively, the accessory timer 104 may not include the timer adjustment actuator 136, but may simply comprise the control actuator 134.

The electronic timer 102 comprises a plurality of visual indicators 118, e.g., light-emitting diodes (LEDs), which are arranged in a vertical linear array on the left side of the bezel 112. The visual indicators 118 are illuminated to represent the present value of the preset timeout period, or to display the amount of time left until the lighting load 108 is turned off. Labels 120 are engraved into the control actuator 114 next to the visual indicators 118 and may comprise numerical representations of the possible preset timeout periods that the associated visual indicator 118 represents. The electronic timer 102 may further comprise a timer icon 122 above the linear array of visual indicators 118. Further, the accessory timer 104 also comprises a timer icon 142.

When the lighting load 108 is off, i.e., the electronic timer 102 is in an "off mode" (or an "off state"), a user of the electronic timer may determine a desired amount of time for the preset timeout period, i.e., the amount of time that the lighting load will remain on after the lighting load is turned on. Accordingly, the user may actuate the timer adjustment actuators 116, 136 to select one of a plurality of predetermined values of the timeout period, e.g., five (5) minutes, ten (10) minutes, fifteen (15) minutes, thirty (30) minutes, forty-five (45) minutes, and sixty (60) minutes, as shown in FIG. 2A. As the user actuates either of the timer adjustment actuators 116, 136, the electronic timer 102 provides a pre-on visual feedback by illuminating one of the visual indicators 118 to designate the present value of the timeout period. For example, if the middle visual indicator 118 next to the text '30' is illuminated, the timeout period will be thirty (30) minutes. Actuations of the timer adjustment actuators 116, 136 do not cause the lighting load 108 to turn on.

After selecting the desired timeout period, the user can turn on the lighting load 108 by actuating either of the control actuators 114, 134. At this time, the electronic timer 102 enters a countdown mode and starts a countdown timer having an initial value equal to the desired timeout period. The electronic timer 102 illuminates the visual indicator 118 that corresponds to the desired timeout period. As the countdown timer decreases, the electronic timer 102 illuminates one of the visual indicators 118 to represent the amount of time left until the lighting load 108 is turned off. For example, if there are ten (10) minutes left in the countdown timer, the electronic timer 102 illuminates the visual indicator 118 adjacent the text '10' on the control actuator 114.

As the countdown timer is counting down to zero minutes, the electronic timer 102 preferably provides an animated visual feedback, i.e., the electronic timer illuminates the visual indicators 118 to show that the electronic timer 102 is actively counting down to zero minutes. According to a preferred embodiment of the present invention, the electronic timer 102 cycles in a downward fashion the visual indicators below the visual indicator representative of the remaining time, which is illuminated constantly. For example, if there are forty-five (45) minutes left in the countdown timer, the visual indictor 118 next to the label 120 of '45' is illuminated constantly, while the four visual indicators below the constantly illuminated visual indicator are turned on and off in a decreasing fashion at a first rate (or "frequency"). Specifically, the '30' visual indicator is turned on for one second and then off. Next, the '15' visual indicator is turned on for one second and then off. Next, the '10' visual indicator is turned on for one second and then off. Finally, the '5' visual indicator is turned on for one second and then off. When there are five (5) minutes or less remaining in the countdown timer, the bottom visual indicator 118 blinks at a rate substantially equal to the first rate (i.e., on for one second and off for one second). Alternatively, other implementations of the animation of the visual indicators 118 may be used to illustrate that the countdown timer is actively counting down to zero minutes.

When there is a small amount of time left in the countdown timer, e.g., one (1) minute, the electronic timer 102 provides a pre-off visual feedback by blinking the bottom visual indicator quickly, i.e., at a second rate faster than the first rate (e.g., on for one-fourth second and off for one-fourth second), to warn the user that the lighting load 108 is about to turn off.

When the countdown timer expires, i.e., after the desired timeout period has elapsed, the electronic timer 102 turns the lighting load 108 off. Before the countdown timer expires and the electronic timer 102 turns the lighting load 108 off, the user may actuate either of the control actuators 114, 134 to manually turn the lighting load off. Therefore, the control actuators 114, 134 provide an override to turn off the lighting load 108 before the countdown timer expires.

According to the present invention, when the lighting load 108 is turned off, the electronic timer 102 remembers the last timeout period that was selected by the user, i.e., the preset timeout period, such that the electronic timer will use the preset timeout period when either of the control actuators 114, 134 are subsequently actuated. Accordingly, the visual indicator 118 representing the preset timeout period is dimly illuminated when the lighting load 108 is off. The user may decide to keep the preset timeout period and simply turn the lighting load 108 on with the selected preset timeout period. Or the user may decide to adjust the timeout period using the timer adjustment actuators 116, 136 to a different timeout period and then turn the lighting load 108 on. Thus, the electronic timer 102 according to the present invention provides a one-button recall of the preset timeout period, i.e., one actuation of either of the control actuators 114, 134 when the lighting load 108 is off starts the countdown timer with the preset timeout period.

The electronic timer 102 is operable to enter a bypass mode in which the countdown timer is disabled and power is continuously provided to the lighting load 108 (i.e., for an indefinite amount of time). The electronic timer 102 enters the bypass mode in response to a number of possible actuations of the control actuators 114, 134 and the timer adjustment actuators 116, 136. First, when the lighting load 108 is off, the user may use the timer adjustment actuators 116, 136 to highlight the top visual indicator 118 in the linear array (next to the 'On' label 120 as shown in FIG. 2A), and subsequently press the respective control actuator 114, 134 once to enter the bypass mode. When the lighting load 108 is on and the countdown timer is enabled, the user may use the timer adjustment actuators 116, 136 to highlight the top visual indicator 118 and the electronic timer 102 instantly changes to the bypass mode. Finally, the electronic timer 102 is operable to enter the bypass mode in response to a double-tap of either of the control actuators 114, 134, i.e., two transitory actuations of the control actuator 114, 134 in quick succession. To differentiate between when the electronic timer 102 is in the bypass mode rather than counting down for the timeout period, the top visual indicator 118 preferably has a different color than the other visual indicators of the linear array, for example, the top visual indicator may be green, while the other visual indicators may be orange.

When the electronic timer 102 is in the bypass mode, the user may actuate either of the control actuators 114, 134 once to turn off the lighting load 108. Actuation of the lower portions 116B, 136B of the timer adjustment actuators 116, 136 (i.e., to highlight the visual indicator 118 for 60 minutes) causes the electronic timer 102 to exit the bypass mode and to begin the countdown timer from 60 minutes. While in the bypass mode, the electronic timer 102 does not change the state of the lighting load 108 in response to an actuation of either of the upper portions 116A, 136A of the timer adjustment actuators 116, 136 or a double tap of either of the control actuators 114, 134. However, the electronic timer 102 will store the bypass mode as the preset timeout period if the either of the upper portions 116A, 136A of the time adjustment actuators 116, 136A are pressed when the electronic timer is in the bypass mode.

When the user double-taps either of the control actuators 114, 134 to enter the bypass mode, the electronic timer 102 does not save the bypass mode as the preset timeout period. Accordingly, when the user presses the control actuator 114, 134 (to turn off the lighting load 108) and then subsequently presses the control actuator 114, 134 again (to turn on the lighting load 108), the electronic timer 102 uses the previously-stored preset timeout period (which is not necessarily the bypass mode).

When the electronic timer 102 is in the countdown mode, the user may actuate the upper portions 116A, 136A and the lower portions 116B, 136B of the timer adjustment actuators 116, 136. The countdown timer instantly changes to the preset timeout period that is selected by the timer adjustment actuator 116, 136 and continues to count down from the newly selected timeout period. If the user selects the bypass mode by highlighting the top visual indicator 118 while the countdown timer is enabled, the electronic timer 102 changes to the bypass mode and disables the countdown timer.

Figure 3A:
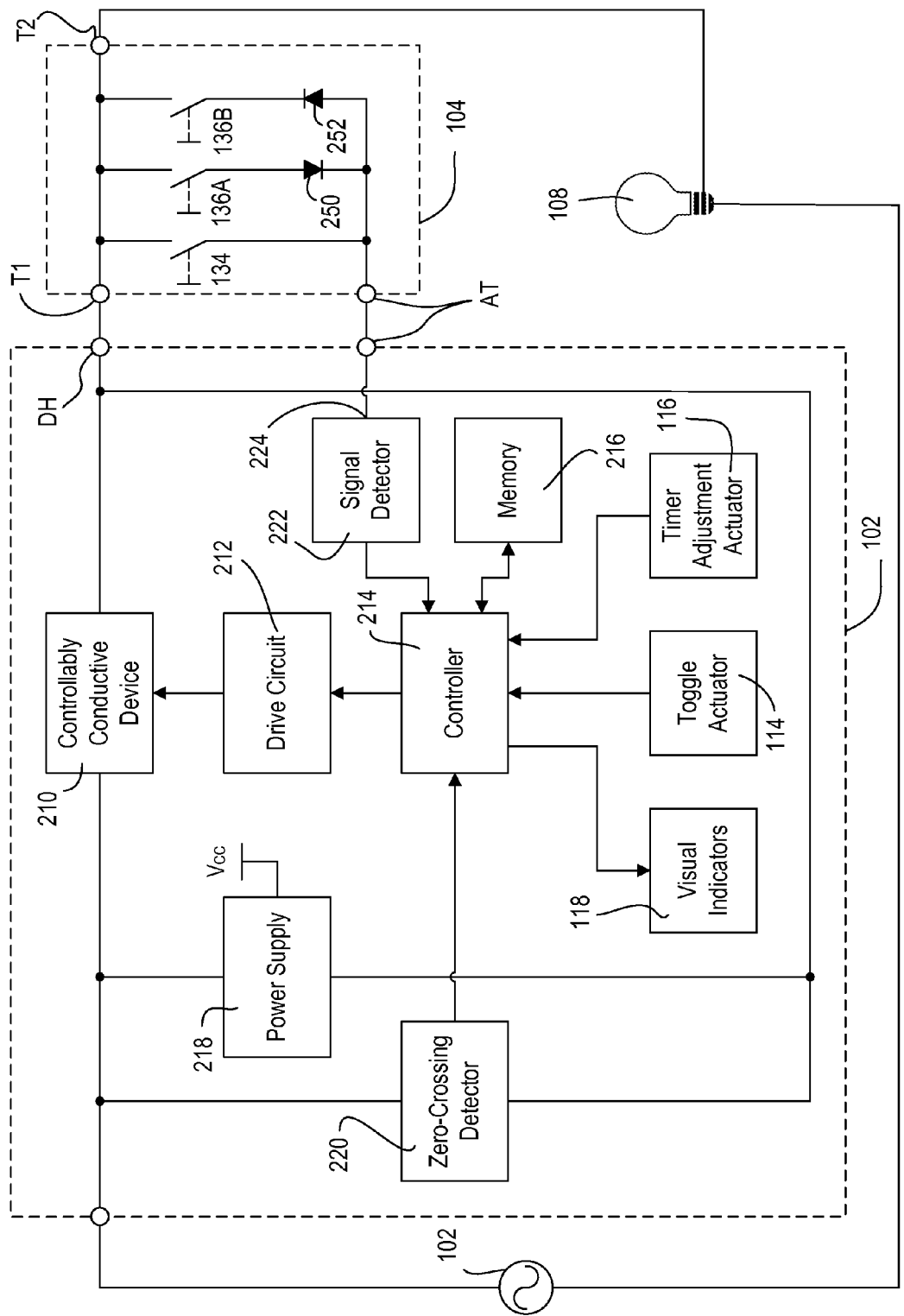
FIG. 3A is a simplified block diagram of the electronic timer and the accessory timer of the timer system of FIG. 1.

FIG. 3A is a simplified block diagram of the electronic timer 102 and the accessory timer 104 of the timer system 100. The electronic timer 102 comprises a controllably conductive device 210 for control of the power delivered to the lighting load 108. The controllably conductive device 210 may comprise a relay, or any suitable type of bidirectional semiconductor switch, such as, for example, a triac, a field-effect transistor (FET) in a rectifier bridge, or two FETs in anti-series connection. The controllably conductive device 210 includes a control input coupled to a drive circuit 212. The input to the control input renders the controllably conductive device 210 conductive or non-conductive, which in turn controls the power supplied to the lighting load 108.

The drive circuit 212 controls the controllably conductive device 210 in response to command signals from a controller 214. The controller 214 is preferably implemented as a microcontroller, but may be any suitable processing device, such as a programmable logic device (PLD), a microprocessor, or an application specific integrated circuit (ASIC). The controller 214 receives inputs from the control actuator 114 and the timer adjustment actuator 116 and controls the visual indicators 118. The controller 214 is operable to turn on (i.e., enabling power to be delivered to) the lighting load 108, and to turn off (discontinue delivering power to) the lighting load in response to the input receives from the control actuator 114. The controller 214 preferably comprises an internal timer, e.g., a countdown timer, for counting down the preset timeout period. The controller 214 is also coupled to a memory 216 for storage of the present value of the preset timeout period. A power supply 218 generates a direct-current (DC) voltage $V_{CC}$, e.g., 5 volts, for powering the controller 214, the memory 216, and other low-voltage circuitry of the electronic timer 102.

A zero-crossing detector 220 determines the zero-crossings of the input AC waveform from the AC power supply 202. A zero-crossing is defined as the time at which the AC supply voltage transitions from positive to negative polarity, or from negative to positive polarity, at the beginning and end of each half-cycle. The zero-crossing information is provided as an input to the controller 214. The controller 214 provides the control inputs to the drive circuit 212 to operate the controllably conductive device 210 (i.e., to provide or block voltage from the AC power supply 202 to the lighting load 108) at predetermined times relative to the zero-crossing points of the AC waveform using a phase-control dimming technique as is well known in the art. Accordingly, the controller 214 is operable to gradually apply power to the lighting load 108 and to gradually remove power from the lighting load (i.e. to "fade" the lighting load 108 between the on state and the off state). Fading of lighting loads is described in greater detail in commonly-assigned U.S. Pat. No. 5,248,919, issued Sep. 29, 1993, entitled LIGHTING CONTROL DEVICE, the entire disclosure of which is hereby incorporated by reference.

The electronic timer 102 further comprises a signal detector 222 having an input 224 coupled to the AT terminal. The signal detector 222 is a simple communication circuit, which is operable to receive switch closure signals from the accessory timer 104. Specifically, the switch closure signals are provided from the control actuator 134, the upper portion 136A of the timer adjustment actuator 136, and the lower portion 136B of the timer adjustment actuator 136, which are represented by momentary switches in FIG. 3. Closure of the switch of the control actuator 134 will connect the signal detector 222 to the switched-hot terminal SH of the electronic timer 102 (when the controllably conductive device is non-conducting each half-cycle), and will allow both positive and negative half-cycles of the AC current to flow through the signal detector.

Closure of the switches of the upper portion 136A and the lower portion 136B of the timer adjustment actuator 136 will also connect the signal detector 222 to the switched-hot terminal SH (when the controllably conductive device is non-conducting each half-cycle). However, when the switch of the upper portion 136A is closed, current only flows through a diode 250 and the signal detector 222 during the negative half-cycles. In a similar manner, when the switch of the lower portion 136B is closed, current only flows through a diode 252 and the signal detector 222 during the positive half-cycles. The duration of the switch closures of the momentary switches of the control actuator 134 and the timer adjustment actuator 136 are typically 100-200 milliseconds in length.

Figure 3B:
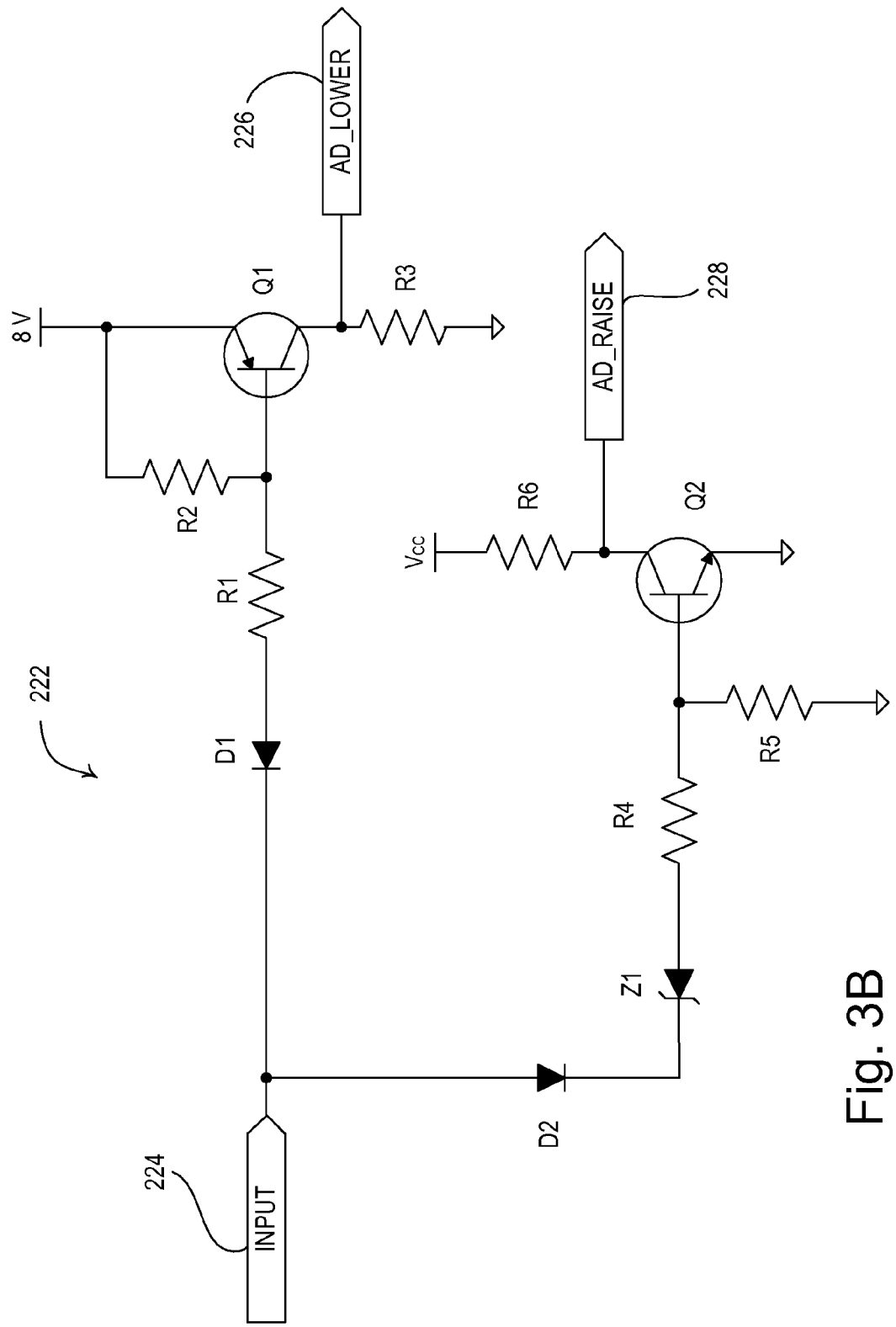
FIG. 3B is a simplified schematic diagram of an example of a signal detector of the electronic timer of FIG. 3A.

FIG. 3B is a simplified schematic diagram of an example of the signal detector 222. The signal detector 222 is operable to detect when the switches of the control actuator 134 and the upper portion 136A and the lower portion 136B of the timer adjustment actuator 136 are closed via the input 224. The signal detector 222 provides two separate output signals 226, 228 representative of the state of the switches to the controller 214. A signal at the first output 226 (AD_LOWER) indicates a closure of the lower portion 136B of the timer adjustment actuator 136 and a signal at the second output 228 (AD_RAISE) indicates a closure of the upper portion 136A of the timer adjustment actuator 136. Simultaneous signals on both outputs represent a closure of the control actuator 134.

The first output 226 is pulled down to circuit common through a resistor R3 when no actuators of the accessory timer 104 are being pressed. When the lower portion 136B of the timer adjustment actuator 136 is pressed, current flows out of the input 224 through a diode D1 and two resistors R1, R2 of the signal detector 222 during the positive half-cycles of the AC power source 106. After a bias voltage develops across the resistor R2, a transistor Q1 begins conducting and pulls the first output 226 up to substantially a DC voltage of 8 volts. Accordingly, an active-high control signal that consists of a pulse during each positive half-cycle will be generated at the first output 226 when the lower portion 136B of the timer adjustment actuator 136 is pressed.

A resistor R6 pulls the voltage at the second output 228 up to the DC voltage $V_{CC}$ of the power supply 218 when no actuators of the accessory timer 104 are being pressed. When the upper portion 136A of the timer adjustment actuator 136 is pressed and the breakdown voltage of a zener diode Z1 is exceeded, current flows into the input 224 through a diode D2, the zener diode Z1, and two resistors R4, R5 during the negative half-cycles of the AC power source 106. The zener diode Z1 limits the voltage across the resistors R4, R5 and thus the current through the resistors. When current flows into the input 224, a bias voltage produced across resistor R5 causes a transistor Q2 to conduct and pull the second output 228 down to circuit common. In this case, an active-low control signal that consists of a pulse during each negative half-cycle will be generated at the second output 228 when the upper portion 136A of the timer adjustment actuator 136 is pressed.

When the control actuator 134 is pressed, current flows through the signal detector 222 during both half-cycles of the AC power source 106. Both the active-high control signal and the active-low control signal are generated at the first and second outputs 226, 228.

Alternatively, if the accessory timer 104 is connected on the line side of the timer system 100, current flows out of the input 224 during the negative half-cycles when the lower portion 136B of the timer adjustment actuator 136 is pressed, and flows into the input 224 during the positive half-cycles when the upper portion 136A of the timer adjustment actuator 136 is pressed. Current flows through the input 224 in the same direction when the accessory timer 104 is connected on the line side or the load side of the timer system 100 and the actuators are pressed. Therefore, the signal detector 222 operates in substantially the same fashion independent of where the accessory timer 104 is located in the timer system 100.

Figure 4:
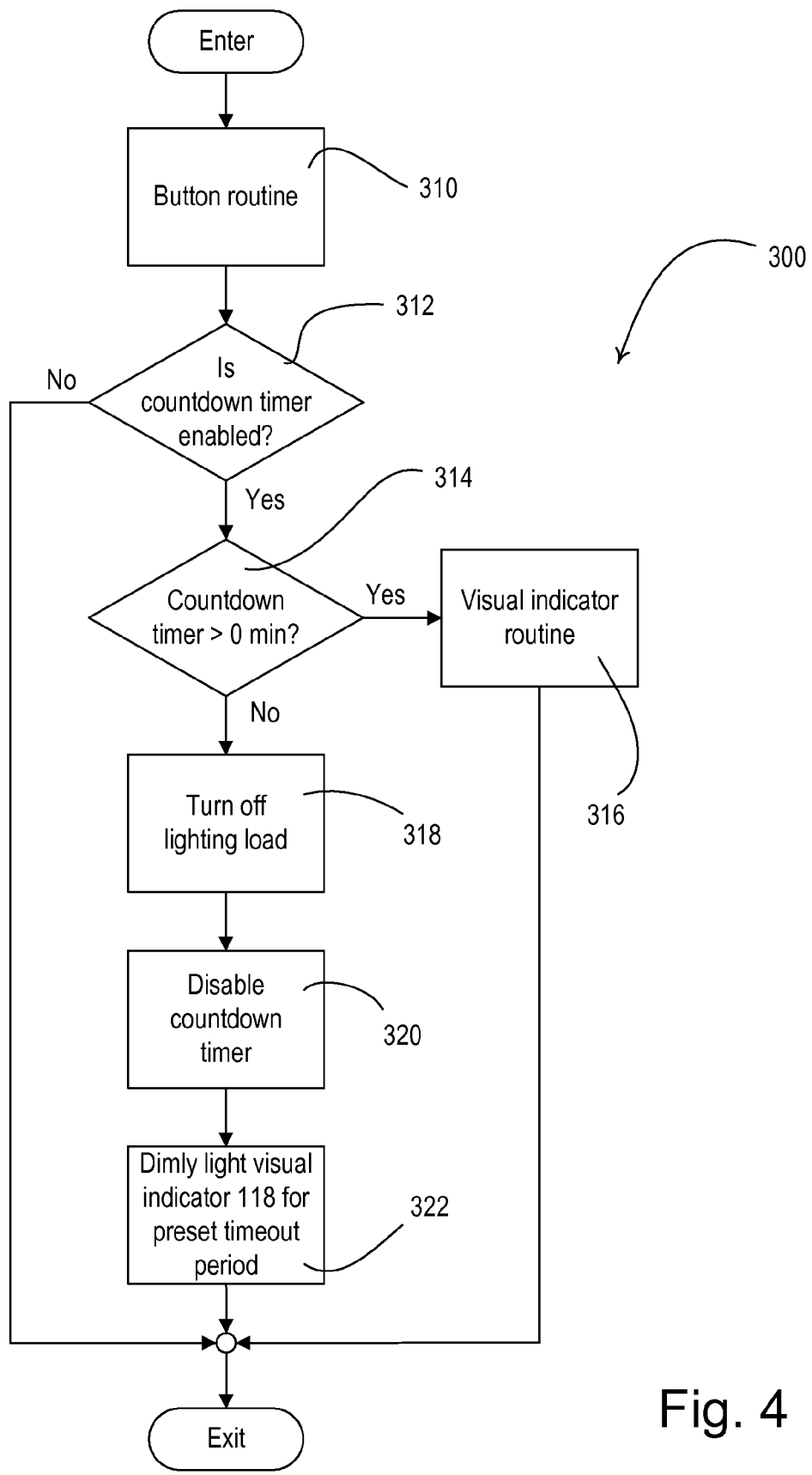
FIG. 4 is a flowchart of a timer procedure executed by a controller of the electronic timer of FIG. 1.
Figure 5A:
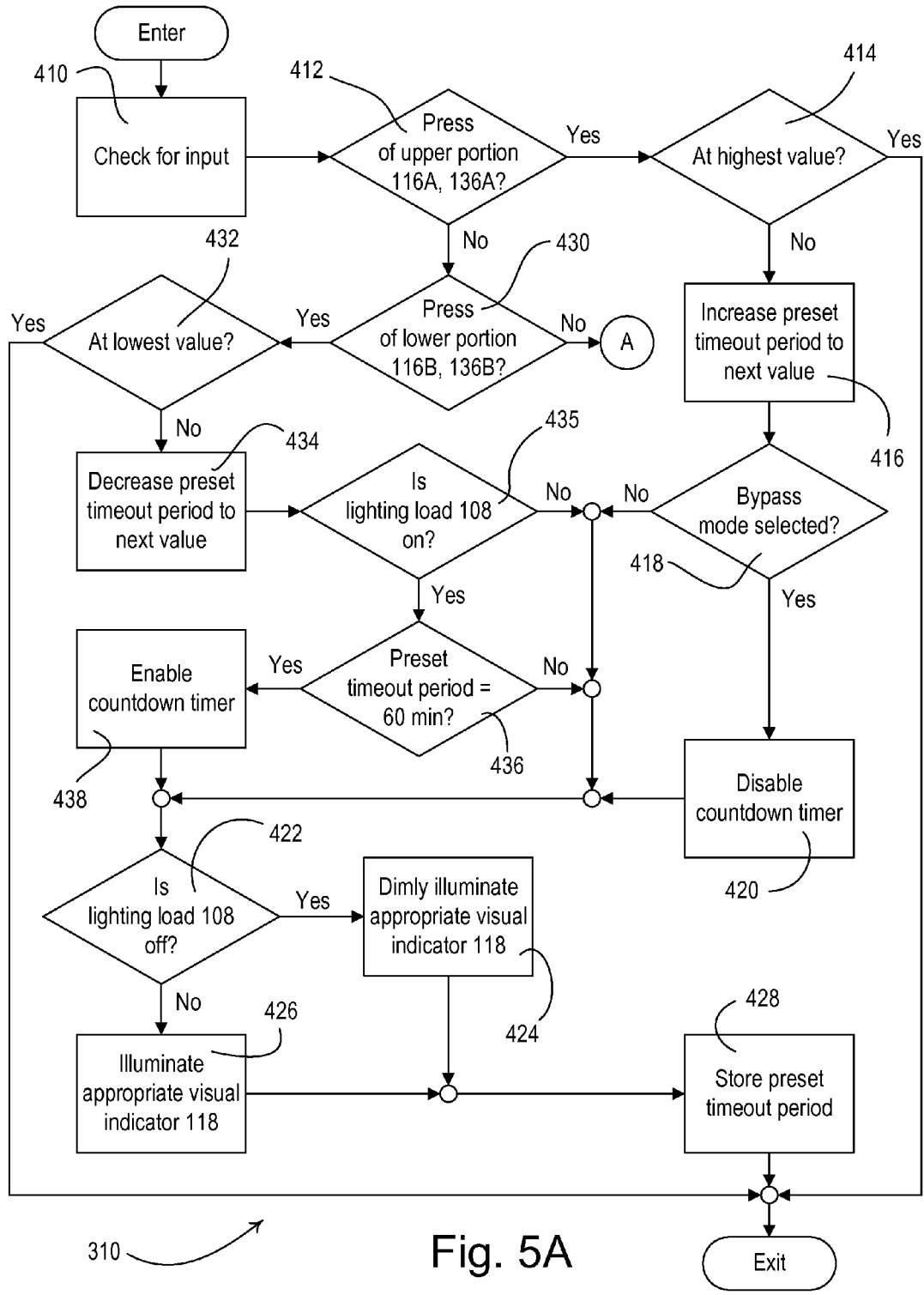
FIGS. 5A and 5B are flowcharts of a button routine of the timer procedure of FIG. 4.
Figure 5B:
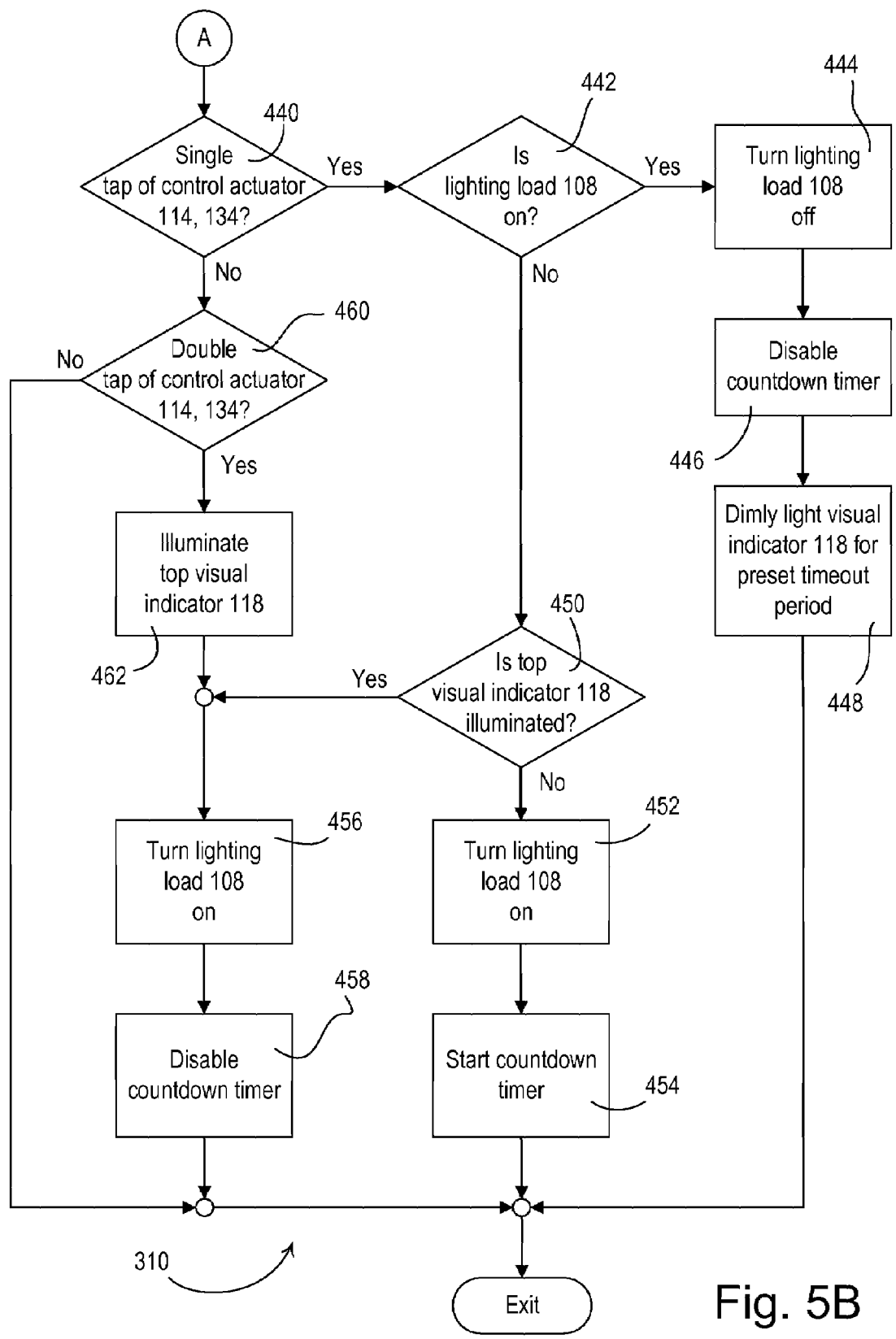

FIG. 4 is a flowchart of a timer procedure 300 executed by the controller 214 of the electronic timer 102 according to the present invention. Preferably, the timer procedure 300 is executed periodically, e.g., as part of a main control loop. The controller 214 uses the countdown timer to determine when the preset timeout period expires in order to turn off the lighting load 108. FIGS. 5A and 5B are flowcharts of a button routine 310, which is the first step of the timer procedure 300. The button routine 310 checks for and processes inputs from the control actuator 114, the timer adjustment actuator 116, and the signal detector 222 (i.e., the control actuator 134 and timer adjustment actuator 134 of the accessory timer 104).

Referring to FIG. 5A, the button routine 310 begins by checking for inputs from the control actuator 114, the timer adjustment actuator 116, and the signal detector 222 at step 410. If an actuation of the upper portion 116A, 136A of either of the timer adjustment actuators 116, 136 has been detected at step 412, a determination is made at step 414 as to whether the present value of the preset timeout period is at the highest value, i.e., the bypass mode according to the first embodiment of the present invention. If the present value of the preset timeout period is at the highest value at step 414, then the button routine 310 simply exits. If the present value of the preset timeout period is not at the highest value at step 414, the value of the preset timeout period is increased to the next possible value at step 416. For example, if the present value is 30 minutes, the value of the preset timeout period is increased to 45 minutes at step 416. If the electronic timer 102 is in the bypass mode at step 418, the countdown timer is disabled, i.e., stopped, at step 420. If the lighting load 108 is off at step 422, the appropriate visual indicator 118 is dimly illuminated at step 424. For example, the middle visual indicator is dimly illuminated if the present value of the preset timeout period is 30 minutes. If the lighting load is on at step 422, the appropriate visual indicator 118 is illuminated to a bright level at step 426. The present value of the preset timeout period (i.e., 5-60 minutes or bypass mode) is stored in the memory 216 at step 428 and the button routine 310 exits.

If a press of the upper portion 116A, 136A of either of the timer adjustment actuators 116, 136 has not been detected at step 412, a determination is made at step 430 as to whether a press of the lower portion 116B, 136B of either of the timer adjustment actuators 116, 136 has been detected. If a press of the lower portion 116B, 136B of either of the timer adjustment actuators 116, 136 has been detected at step 430 and the present value of the preset timeout period is not at the lowest value (i.e., 5 minutes) at step 432, the present value of the preset timeout period is decreased to the next possible value at step 434. If the lighting load 108 is on at step 435 and the preset timeout period is now 60 minutes (i.e., the electronic timer 102 was previously in the bypass mode) at step 436, the countdown timer is initiated to 60 minutes and enabled at step 438. Next, the appropriate visual indicator 118 is illuminated either to a dim level at step 424 or to a bright level at step 426. The present value of the preset timeout period is stored in the memory 216 at step 428, and the button routine 310 exits. If the present value of the preset timeout period is at the lowest value at step 432, the button routine 310 simply exits.

Referring to FIG. 5B, if a press of the upper portion 116A, 136A or the lower portion 116B, 136B of the timer adjustment actuator 116, 136 have not been detected, a determination is made at step 440 as to whether a single tap of either of the control actuators 114, 134 has occurred. If a single tap of either of the control actuators 114, 134 has been detected at step 440 and the lighting load 108 is on at step 442, the lighting load is turned off at step 444. The countdown timer is stopped (i.e., disabled) at step 446, and the visual indicator 118 representing the present value of the preset timeout period is dimly lit at step 448. If the lighting load is not on at step 442 and the top visual indicator 118 is not illuminated (i.e., the bypass mode is not selected) at step 450, the lighting load 108 is turned on at step 452 and the countdown timer is initiated to the preset timeout period and started (i.e., enabled) at step 454.

If the top visual indicator 118 on the electronic timer 102 is illuminated (i.e., the bypass mode is selected) at step 450, the lighting load 108 is turned on at step 456 and the countdown timer is disabled at step 458. If a single tap of either of the control actuators 114, 134 is not detected at step 440, but a double tap of either of the control actuators 114, 134 is detected at step 460, the electronic timer 102 enters the bypass mode by illuminating the top visual indicator 118 at step 462, turning on the lighting load 108 at step 456, and disabling the countdown timer at step 458.

Referring back to FIG. 4, once the button routine 310 is completed, a determination is made at step 312 as to whether the countdown timer is enabled, i.e., counting down for the preset timeout period. If not, the timer procedure 300 simply exits. Accordingly, when the lighting load 108 is off and when the electronic timer 102 is in the bypass mode, the controller 214 will periodically execute only the button procedure 310.

Figure 6:
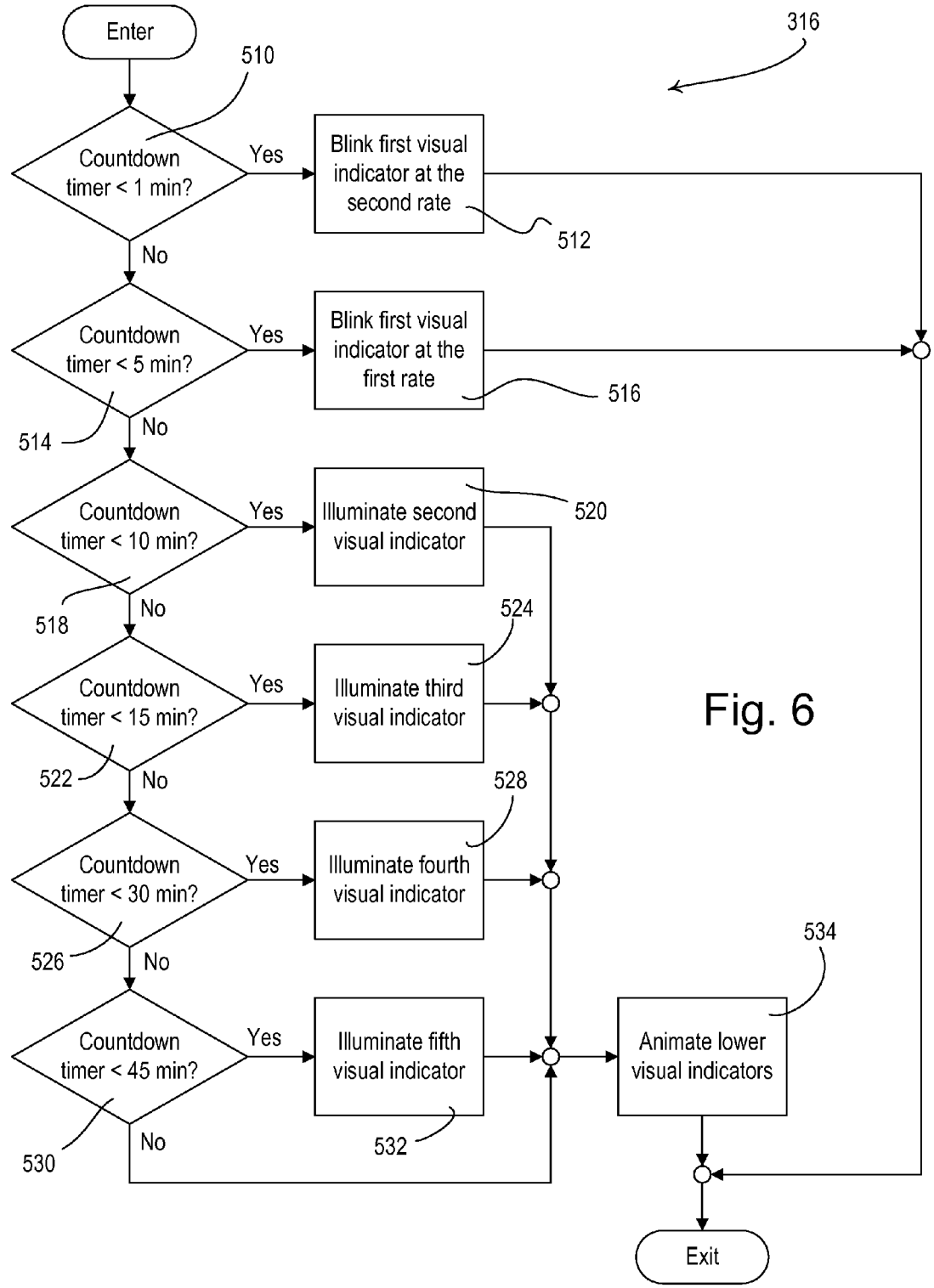
FIG. 6 is a flowchart of a visual indicator procedure of the timer procedure of FIG. 4.

If the countdown timer is enabled at step 312 and the countdown timer is greater than zero (0) minutes, i.e., has not expired, at step 314, a visual indicator routine 316 is executed. FIG. 6 is a flowchart of the visual indicator routine 316. Referring to FIG. 6, if the countdown timer is less than one (1) minute at step 510, the controller 214 blinks the first visual indicator 118, i.e., the bottom visual indicator in the linear array, at step 512, and then exits the visual indicator routine 316. Preferably, at step 512, the first visual indicator 118 is controlled to blink at the second rate, which is greater than the first rate. If the countdown timer is less than five (5) minutes at step 514, the controller 214 blinks the first visual indicator 118 at the first rate at step 516. If the countdown timer is less than ten (10) minutes at step 518, less than fifteen (15) minutes at step 522, less than thirty (30) minutes at step 526, or less than forty-five (45) minutes at step 530, the controller constantly illuminates, respectively, the second visual indicator at step 520, the third visual indicator at step 524, the fourth visual indicator at step 528, or the fifth visual indicator at step 532. In this manner, the illuminated one of the linear array of visual indicators 118 decreases as the countdown timer decreases, and the bottom visual indicator is blinked during the last minute before the countdown timer expires.

After steps 520, 524, 528, 530, and 532, the controller 214 animates the lower visual indicators 118 at step 534 to illustrate that the countdown timer is actively counting down. Accordingly, the controller 214 may execute a routine during step 534, such that the visual indicators 118 in the linear array below the constantly illuminated visual indicator (i.e., illuminated in steps 520, 524, 528, and 532) are cycled in a decreasing fashion. Alternatively, another animation could be implemented. For example, the visual indicators 118 in the linear array below the constantly illuminated visual indicator could each be turned on (rather than cycled) one-by-one in a decreasing fashion. Such animation routines are easily programmed by one skilled in the art and are not discussed in greater detail herein.

Referring back to FIG. 4, if the countdown timer has expired, i.e., is less than or equal to zero (0) minutes, at step 314, the controller 214 turns off the lighting load 108 at step 318. At step 320, the countdown timer is disabled. The visual indicator 118 representative of the preset timeout period is dimly illuminated at step 322 and the timer procedure 300 exits.

The bypass mode may be disabled, for example, by using an advanced programming procedure of the electronic timer 102. Accordingly, when the bypass mode is disabled, the user cannot cause the electronic timer 102 to enter the bypass mode by using the control actuator 114 or the timer adjustment actuator 116. Further, the electronic timer 102 may be programmed via the advanced programming mode to operate with a "locked" or "protected" preset timeout period, i.e., the preset timeout period cannot be changed. An exemplary advanced programming procedure is described in greater detail in U.S. patent application Ser. No. 10/892,510, filed Jul. 15, 2004, entitled PROGRAMMABLE WALLBOX DIMMER, the entire disclosure of which is hereby incorporated by reference.

Figure 7:
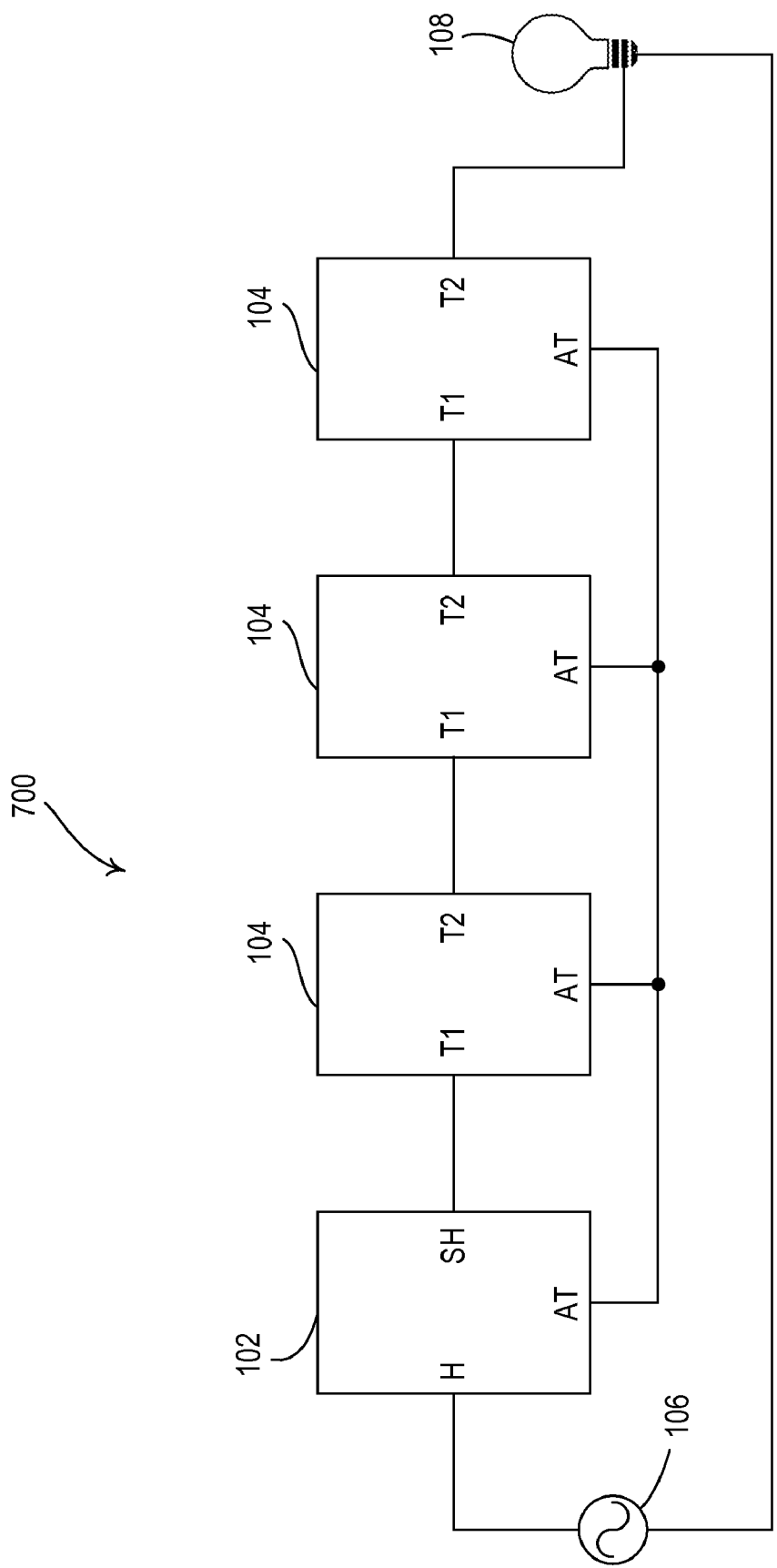
FIG. 7 is a simplified block diagram of a multiple location electronic timer system according to a second embodiment of the present invention.

FIG. 7 is a simplified block diagram of a multiple location electronic timer system 700 according to a second embodiment of the present invention. The timer system 700 includes a plurality of accessory timers 104 (e.g., three accessory timers as shown in FIG. 7). The accessory timer terminal AT of each of the accessory timers 104 is coupled to the accessory timer terminal AT of the electronic timer 102, such that the electronic timer 102 is operable to control the lighting load 108 in response to actuations of the control actuator 134 or the timer adjustment actuator 136 of any of the accessory timers 104. Since the accessory timers 104 are essentially coupled in parallel, the electronic timer 102 is responsive to actuations of the control actuators 134 and the timer adjustment actuators 136 of each of the accessory timers.

The operation of a multiple-location lighting control system that does not include electronic timers is described in greater detail in commonly-assigned U.S. Pat. No. 5,798,581, issued Aug. 25, 2998, entitled LOCATION INDEPENDENT DIMMER SWITCH FOR USE IN MULTIPLE LOCATION SWITCH SYSTEM, AND SWITCH SYSTEM EMPLOYING SAME, the entire disclosure of which is hereby incorporated by reference.

Figure 8:
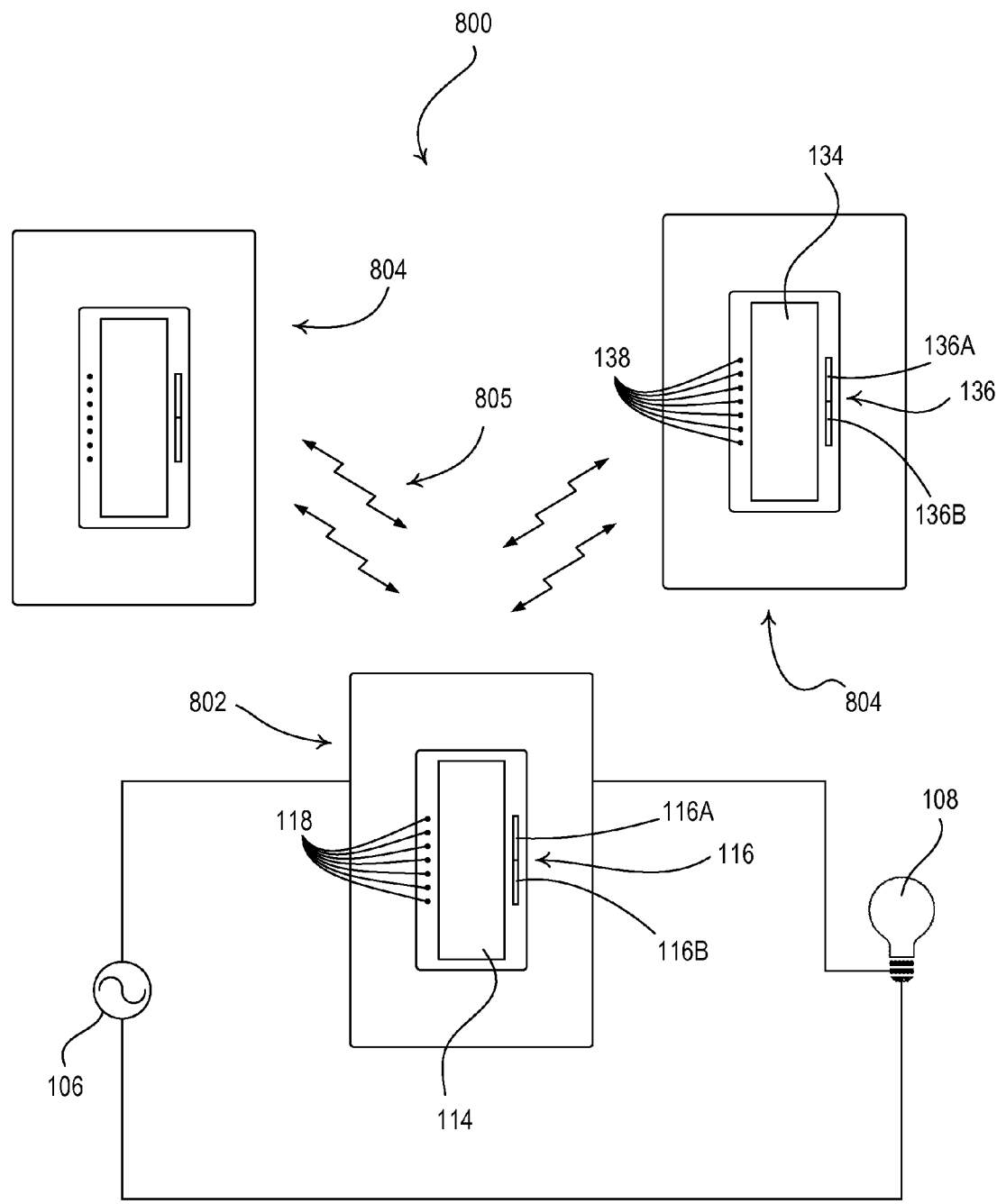
FIG. 8 is a simplified block diagram of a radio-frequency (RF) multiple location electronic timer system according to a third embodiment of the present invention.

FIG. 8 is a simplified block diagram of a radio-frequency (RF) multiple location electronic timer system 800 according to a third embodiment of the present invention. The timer system 100 comprises an RF electronic timer 802 coupled between the AC power source 102 and the lighting load 108 and a plurality of RF accessory timers 804 (e.g., two accessory timers as shown in FIG. 8). The electronic timers 802 and the accessory timers 804 all include control actuators 114, 134, timer adjustment actuators 116, 136, and visual indicators 118, 138. The RF timer system 800 uses a two-way RF communication link for communication of RF signals 805 between the electronic timer 802 and the accessory timers 804. Examples of RF lighting control systems are described in greater detail in commonly-assigned U.S. Pat. No. 5,905,442, issued May 18, 1999, entitled METHOD AND APPARATUS FOR CONTROLLING AND DETERMINING THE STATUS OF ELECTRICAL DEVICES FROM REMOTE LOCATIONS, and commonly-assigned U.S. Pat. No. 6,803,728, issued Oct. 12, 2004, entitled SYSTEM FOR CONTROL OF DEVICES. The entire disclosures of both patents are hereby incorporated by reference.

Figure 9:
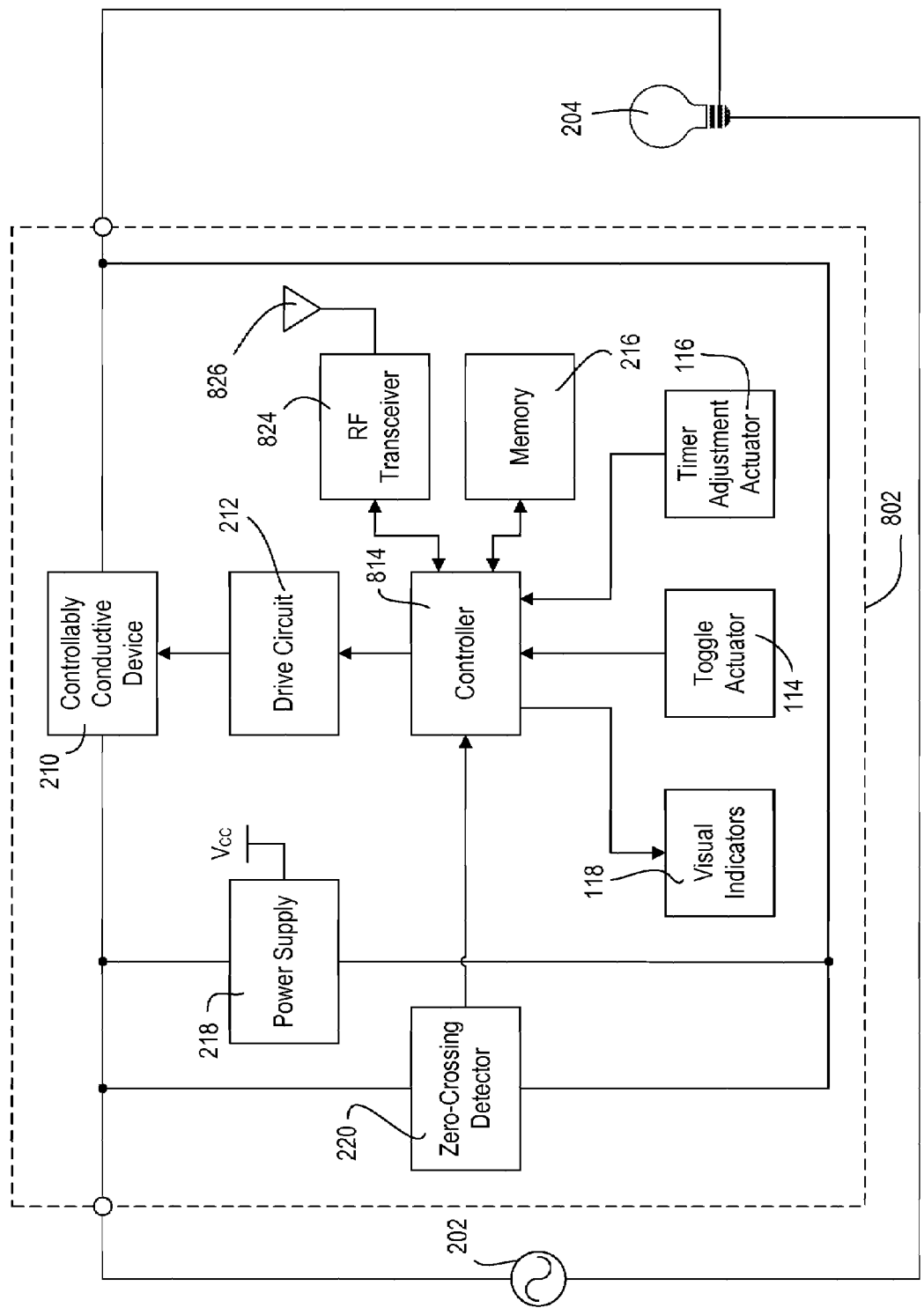
FIG. 9 is a simplified block diagram of an RF electronic timer of the RF timer system of FIG. 8.

FIG. 9 is a simplified block diagram of the RF electronic timer 802, which has a similar structure to the electronic timer 102 of the timer system 100 of FIG. 1. The electronic timer 802 includes a controller 814 for control of the controllably conductive device 210 and the visual indicators 118 in response to actuations of the control actuator 114 and the timer adjustment actuator 116. The operation of the electronic timer 802 in response to actuations of the control actuator 114 and the timer adjustment actuator 116 is the same as the electronic timer 102.

The RF electronic timer 802 further comprises a RF transceiver 824 and an antenna 826 for transmitting the RF signals 805 to and receiving the RF signals from the RF accessory timers 804. The controller 814 is further operable to control the controllably conductive device 210 and change the preset timeout period in response to the messages received via the RF signals 805. Examples of the antenna 826 for wall-mounted load control devices, such as the electronic timer 802 and the accessory timers 804, are described in greater detail in U.S. Pat. No. 5,982,103, issued Nov. 9, 1999, and U.S. patent application Ser. No. 10/873,033, filed Jun. 21, 2006, both entitled COMPACT RADIO FREQUENCY TRANSMITTING AND RECEIVING ANTENNA AND CONTROL DEVICE EMPLOYING SAME, the entire disclosures of which are both hereby incorporated by reference. The structure of the RF accessory timers 804 is similar to the structure of the RF electronic timer 802 as shown in FIG. 9 except that the RF accessory timers 804 do not include the controllably conductive device 210 or the drive circuit 212.

Upon actuation of the control actuator 134 or the timer adjustment actuator 136, the RF accessory timer 804 is operable to transmit digital messages to the RF electronic timer 802 via the RF signals 805. Accordingly, the RF electronic timer 802 is responsive to the digital messages to change the value of the present timeout period, to turn on the lighting load 108 using the preset timeout period, to turn off the lighting load (i.e., in response to an actuation of the control actuator 134 of the accessory timer 804), and to enter the bypass mode (i.e., in response to a double tap of the control actuator 134 of the accessory timer 804 or the top visual indicator 138 of the accessory timer 804 being highlighted).

Further, the RF accessory timers 804 are operable to control the visual indicators 138 in response to digital messages received from the RF electronic timer 802 via the RF signals 805. Accordingly, the visual indicators 138 of each of the RF accessory timers 804 are representative of the present value of the preset timeout period of the electronic timer 802 or the amount of time left before the lighting load 108 is turned off.

Figure 10:
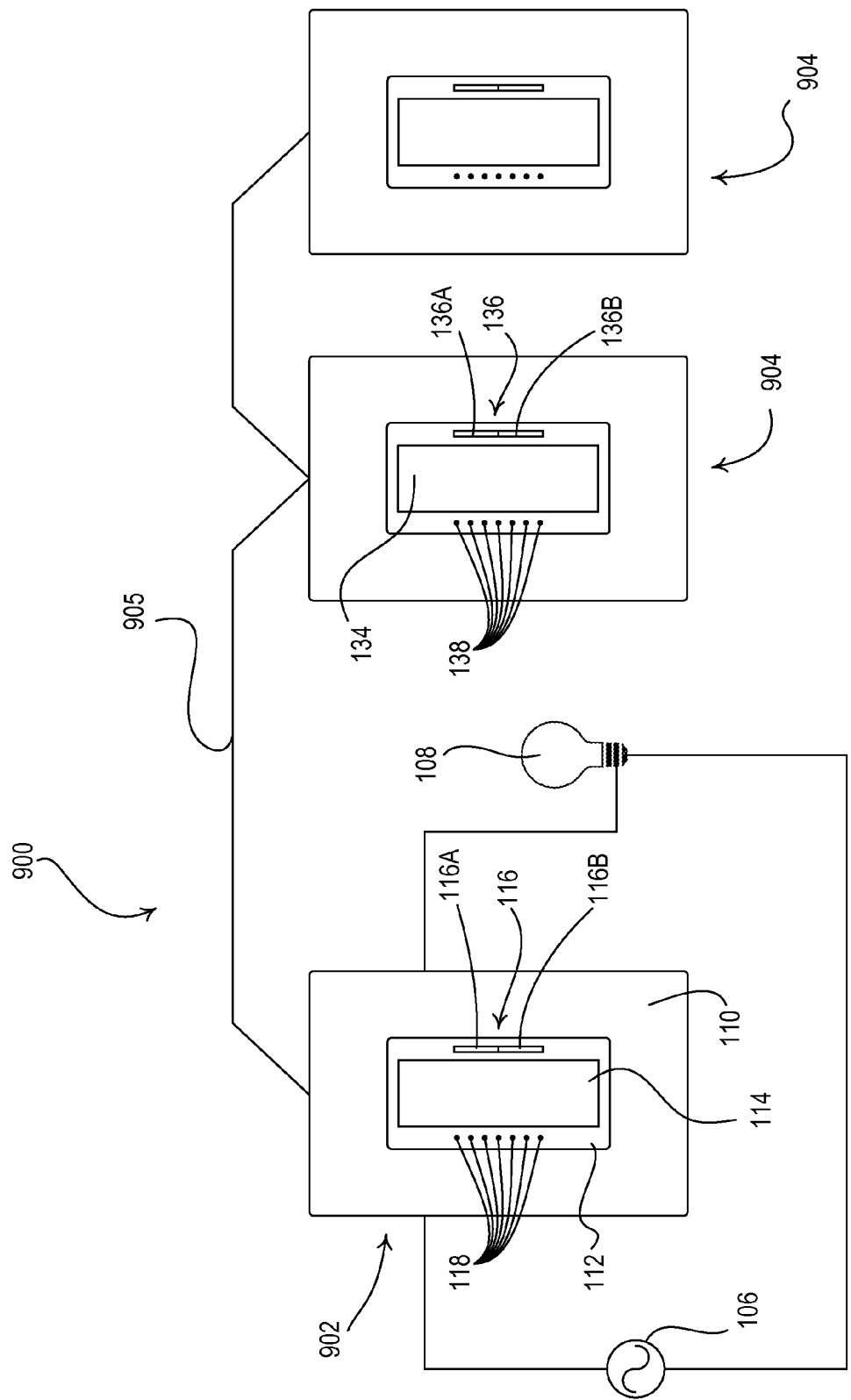
FIG. 10 is a simplified block diagram of a multiple location electronic timer system having a wired communication link according to a fourth embodiment of the present invention.

FIG. 10 is a simplified block diagram of a multiple location timer system 900 according to a fourth embodiment of the present invention. The timer system 900 comprises an electronic timer 902 and two accessory timers 904, which are operable to communicate via a wired digital communication link 905. The wired digital communication link 905 may comprise a four-wire communication link, for example, an RS-485 communication link, or a two-wire digital addressable lighting interface (DALI) communication link. The operation of the wired timer system 900 is similar to the operation of the RF timer system 800. The electronic timer 902 is responsive to the digital messages received from the accessory timers 904 via the wired communication link 905 to control the lighting load 108 and to change the preset timeout period. Further, the accessory timers 904 are operable to control the visual indicators 138 in response to digital messages received from the electronic timer 902 via the wired communication link 905.

Figure 11:
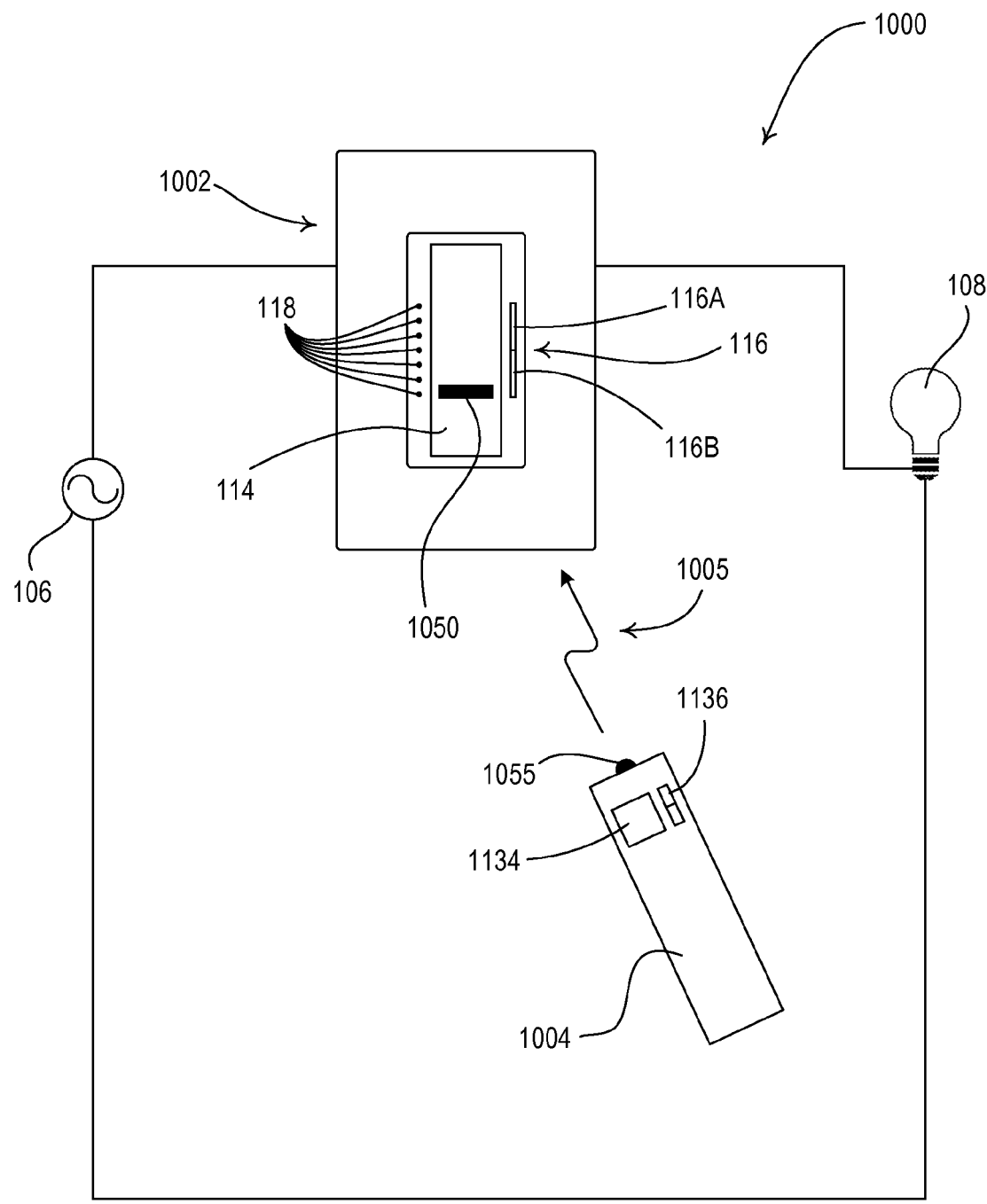
FIG. 11 is a simplified block diagram of a multiple location timer system having an infrared communication link according to a fifth embodiment of the present invention.

FIG. 11 is a simplified block diagram of a multiple location timer system 1000 according to a fifth embodiment of the present invention. The timer system 1000 comprises an electronic timer 1002 and an infrared (IR) timer remote control 1004, i.e., an IR accessory timer. The electronic timer 1002 is operable to receive IR signals 1005 transmitted from the timer remote control 1004 (i.e., via an IR communication link). The electronic timer 1002 comprises an IR lens 1050 to focus the IR signals 1005 to an IR receiver (not shown) inside the electronic timer 1002. The timer remote control 1004 includes a control actuator 1134 and a timer adjustment actuator 1136. The timer remote control 1004 is operable to transmit the IR signals 1005 to the electronic timer 1002 via an IR transmitter 1055, i.e., an IR diode, in response to actuations of the control actuator 1134 and the timer adjustment actuator 1136. Accordingly, the electronic timer 1002 is responsive to actuations of the control actuator 1134 and the timer adjustment actuator 1136 in a similar fashion as the electronic timers 102, 802, 902 of the other embodiments of the present invention are responsive to actuations of the actuators of the control actuator 134 and the timer adjustment actuator 136.

As shown in FIG. 11, the IR communication link allows for one-way communication, i.e., from the timer remote control 1004 to the electronic timer 1002. Alternatively, the IR communication link may comprise a two-way IR communication link. Further, the timer system 1000 could also include an IR accessory timer operable to communicate with the electronic timer 1002 via the two-way IR communication link. An example of a lighting control system having a two-way IR communication link is described in greater detail in commonly-assigned U.S. Pat. No. 6,300,727, issued Oct. 9, 2001, entitled LIGHTING CONTROL WITH WIRELESS REMOTE CONTROL AND PROGRAMMABILITY, the entire disclosure of which is hereby incorporated by reference.

Alternatively, the two-way RF communication link of the RF timer system 800 of FIG. 8, the wired digital communication link of the timer system 900 of FIG. 10, and the IR communication link of the timer system 1000 of FIG. 11 could be implemented as any type of wired or wireless communication link, such as, for example, a power line carrier (PLC) communication link.

Figure 12:
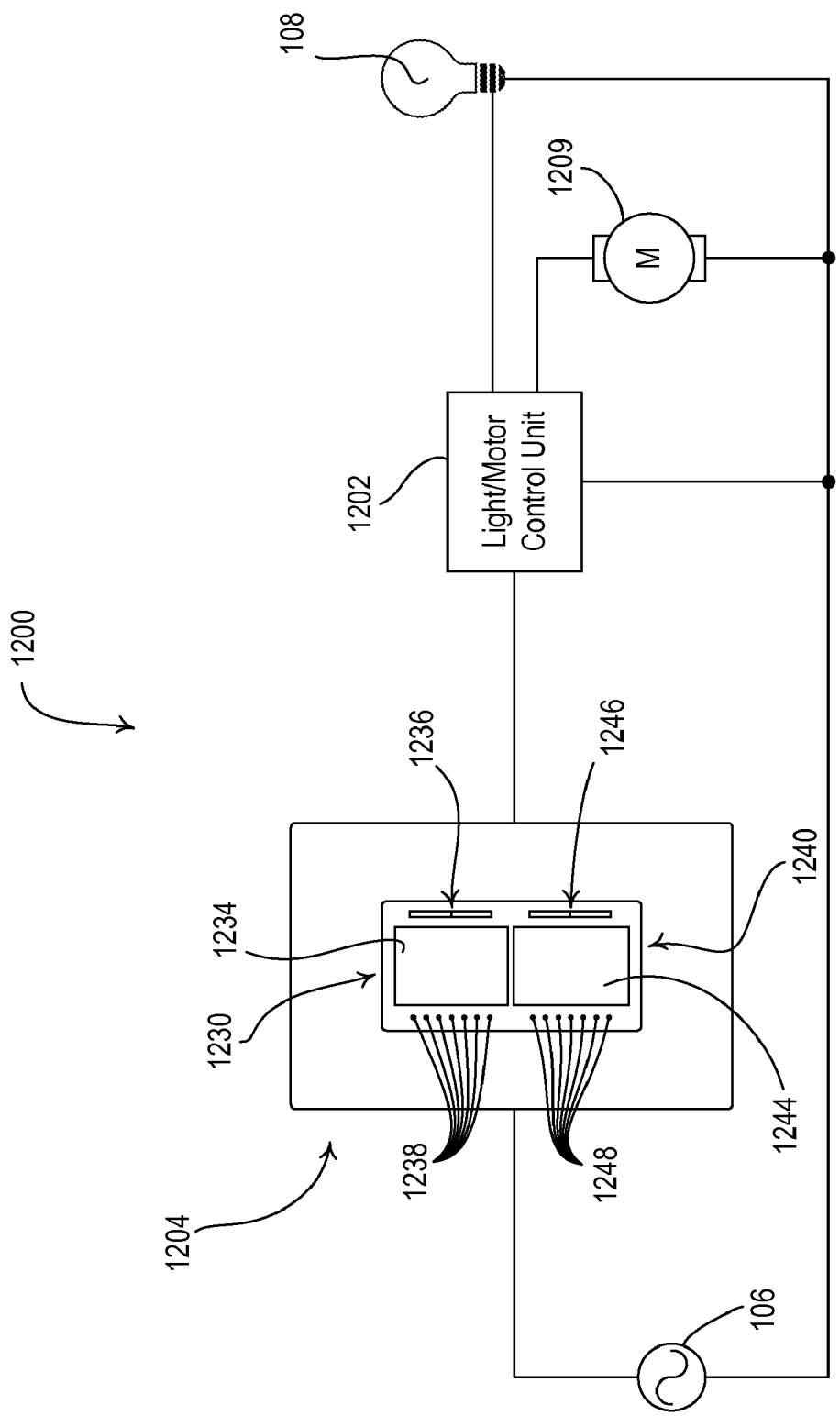
FIG. 12 is a simplified block diagram of a multiple location timer system for independent control of a lighting load and a fan motor according to a sixth embodiment of the present invention.

FIG. 12 is a simplified block diagram of a multiple location timer system 1200 for independent control of the lighting load 108 and a fan motor 1209, e.g., an exhaust fan, according to a sixth embodiment of the present invention. The timer system 1200 includes a light/motor control unit 1202 and a dual dimmer/timer remote control 1204, i.e., an accessory control. The light/motor control unit 1202 is operable to control both the intensity of a lighting load 108 and the speed of the fan motor 1209 in response to current-carrier control signals transmitted by the remote control 1204

The remote control 1204 includes a first dimmer user interface portion 1230 and a second timer user interface portion 1240. Preferably, the light/motor control unit 1202 is operable to control the intensity of the lighting load 108 in response to the dimmer user interface portion 1230 and to control the motor 1209 in response to the timer user interface portion 1240. Further, the light/motor control unit 1202 operates as an electronic timer in response to the timer user interface portion 1240, i.e., turns on the motor 1209, and subsequently turns off the motor automatically after a preset timeout period has elapsed. The dimmer user interface portion 1230 includes a control actuator 1234 for turning the lighting load 108 on and off, an intensity adjustment actuator 1236 for adjusting the intensity of the lighting load 108, and a plurality of visual indicators 1238 for providing feedback in regards to the status (e.g., the intensity) of the lighting load 108. The timer user interface portion 1240 includes a control actuator 1244 for turning the motor 1209 on and off, a timer adjustment actuator 1246 for adjusting the preset timeout period, and a plurality of visual indicators 1248 for displaying the present value of the preset timeout period or the amount of time left until the motor 1209 is turned off.

Figure 13:
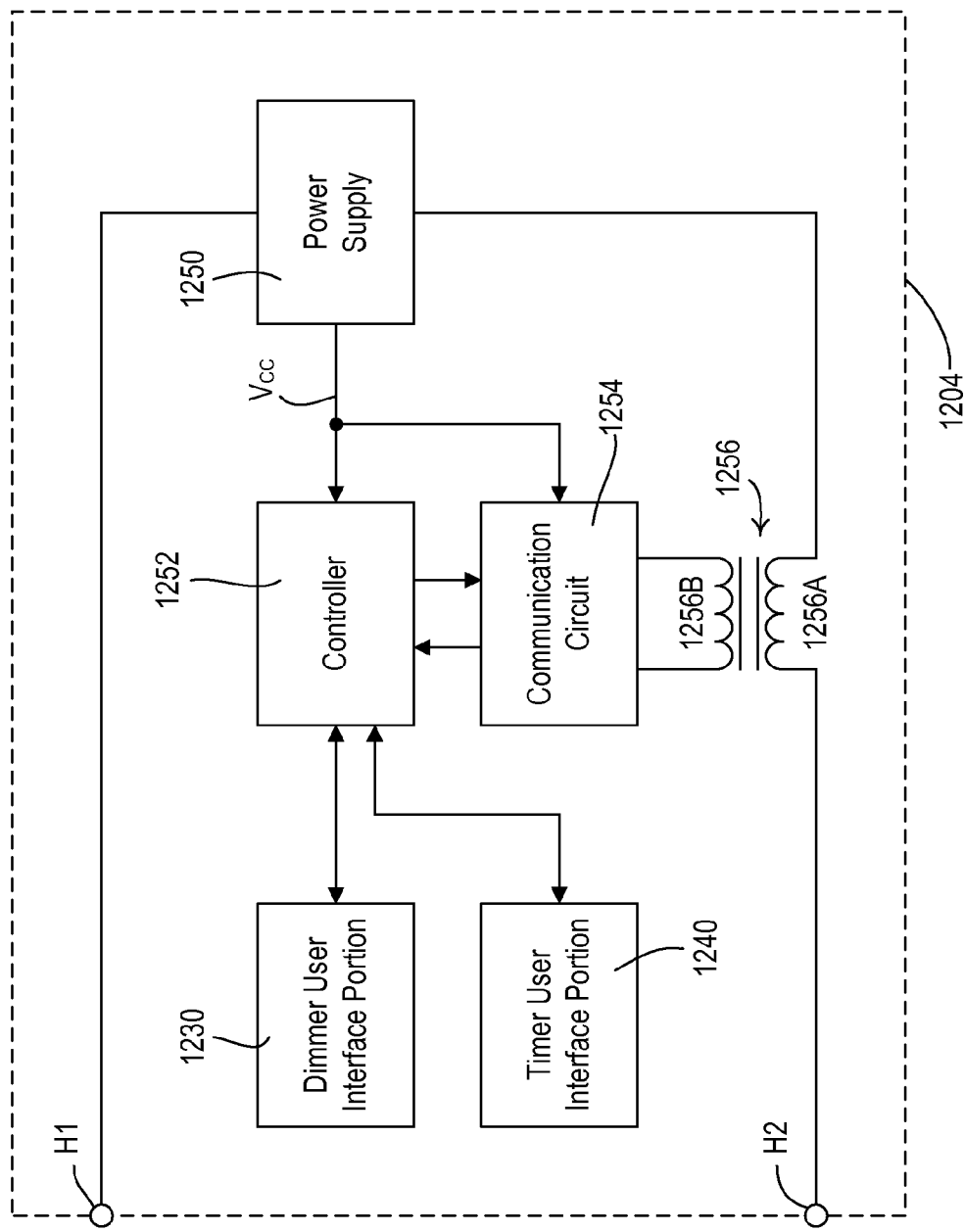
FIG. 13 is a simplified block diagram of a remote control of the multiple location timer system of FIG. 12.

FIG. 13 is a simplified block diagram of the remote control 1204 of the multiple location timer system 1200. A power supply 1250 is provided in series between a first electrical terminal H1 and a second electrical terminal H2. The power supply 1250 provides a DC voltage $V_{CC}$ to power a controller 1252 and a communication circuit 1254. The controller 1252 accepts control inputs from the control actuator 1234 and the intensity adjustment actuator 1236 of the first dimmer user interface portion 1230 and from the control actuator 1244 and the timer adjustment actuator 1246 of the second timer user interface portion 1240. The controller 1252 also controls the operation of the visual indicators 1238 of the first dimmer user interface portion 1230 and the visual indicators 1248 of the second timer user interface portion 1240.

The controller 1252 is coupled to the communication circuit 1254 for transmitting and receiving current-carrier control signals with the light/motor control unit 1202 of the multiple location timer system 1200. The communication circuit 1254 transmits and receives the control information via a communication transformer 1256 over the electrical power wiring coupled from the AC voltage source 106 to the remote control 1204 and the light/motor control unit 1202. The communication transformer 1256 has a primary winding 1256A that is connected in series electrical connection with the terminals H1, H2 of the remote control 1204, and a secondary winding 1256B that is coupled to the communication circuit 1254. The light/motor control unit 1202 has similar functional blocks as those shown in FIG. 13 for the remote control 1204, but also includes a dimmer circuit (not shown) and a motor control circuit (not shown) for controlling the amount of power delivered to the lighting load 108 and the motor 1209, respectively.

The timer system 1200 uses a current-carrier technique to communicate between the remote control 1204 and the light/motor control unit 1202. The primary windings of each of the current transformers 1256 of the remote controller 1204 and the light/motor control unit 1202 are coupled in series electrical connection, forming a communication current loop that also flows through the AC power source 106. The current-carrier communication technique of the timer system 1200 is described in greater detail in commonly-assigned co-pending U.S. patent application Ser. No. 11/447,431, filed Jun. 6, 2006, entitled SYSTEM FOR CONTROL OF LIGHTS AND MOTORS, the entire disclosure of which is hereby incorporated by reference.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A multiple location electronic timer system for controlling the power delivered to an electrical load from an AC power source, the system comprising:
a wall-mountable electronic timer adapted to be coupled in series electrical connection between the source and the load, the electronic timer comprising an internal timer, a timer adjustment actuator, and a plurality of visual indicators; and
a wall-mountable accessory timer;
wherein the electronic timer is operable to:
select a preset timeout period in response to an actuation of the timer adjustment actuator;
cause the visual indicators to display a representation of the preset timeout period;
enable the delivery of power to the load in response to a control signal received directly from the accessory timer;
start the internal timer in response to the control signal received from the accessory timer, the internal timer initialized with the preset timeout period; and
prevent the delivery of power to the load when the preset timeout period has elapsed.

2. The timer system of claim 1, wherein the accessory timer comprises a user interface adapted to receive user inputs, and the control signal is representative of the user inputs.

3. The timer system of claim 2, wherein the user interface of the accessory timer further comprises a control actuator.

4. The timer system of claim 3, wherein the electronic timer is operable to enter a bypass mode in response to a first actuation of the control actuator of the accessory timer, whereby the load is turned on for an indefinite amount of time in the bypass mode.

5. The timer system of claim 4, wherein the first actuation comprises a double tap of the control actuator of the accessory timer.

6. The timer system of claim 3, wherein the user interface of the accessory timer comprises a timer adjustment actuator, the electronic timer operable to change the preset timeout period in response to an actuation of the timer adjustment actuator of the accessory timer.

7. The timer system of claim 3, wherein the electronic timer is operable to enable the delivery of power to the load in response to a first actuation of the control actuator of the accessory timer, and to prevent the delivery of power to the load in response to a second actuation of the control actuator of the accessory timer.

8. The timer system of claim 2, wherein the user interface comprises a plurality of visual indicators.

9. The timer system of claim 8, wherein the accessory timer is operable to cause the visual indicators to display a representation of the preset timeout period or a representation of the amount of time left until the preset timeout period elapses.

10. The timer system of claim 1, further comprising:
a communication link coupled between the electronic timer and the accessory timer, such that the electronic timer is operable to receive the control signal from the accessory timer via the communication link.

11. The timer system of claim 10, wherein the control signal comprises a digital message.

12. The timer system of claim 11, wherein the communication link comprises one of a radio frequency communication link, an infrared communication link, a power line carrier communication link, and a wired digital communication link.

13. The timer system of claim 11, wherein the control signal comprises a current-carrier signal.

14. The timer system of claim 10, wherein the electronic timer comprises a hot terminal adapted to be coupled to the source, a switched-hot terminal adapted to be coupled to the load, an accessory timer terminal adapted to be coupled to the accessory timer for receipt of the control signal, and a signal detector operable to detect current flow through the accessory timer terminal; and
wherein the accessory timer comprises a momentary switch adapted to be coupled between the accessory timer terminal of the electronic timer and one of the hot terminal and the switched-hot terminal of the electronic timer, and an actuation of the momentary switch allows current to flow through the accessory timer terminal of the electronic timer.

15. The timer system of claim 1, further comprising:
a plurality of accessory timers;
wherein the electronic timer is operable to control the power delivered to the load in response to a plurality of control signals received from the accessory timers.

16. A multiple location electronic timer system for controlling the power delivered to an electrical load from an AC power source, the system comprising:

an electronic timer adapted to be coupled in series electrical connection between the source and the load, such that the electronic timer is operable to enable the delivery of power to the load, and subsequently to prevent the delivery of power to the load automatically when a preset timeout period has elapsed; and a wall-mountable accessory timer comprising a user interface adapted to receive user inputs;

wherein the electronic timer is operable to:

enable the delivery of power to the load in response to a first control signal received from the accessory timer;

prevent the delivery of power to the load in response to a second control signal received from the accessory timer; and enter a bypass mode in response to a third control signal received from the accessory timer, whereby the load is turned on for an indefinite amount of time.

17. The timer system of claim 16, wherein the user interface of the accessory timer further comprises a control actuator.

18. The timer system of claim 17, wherein the first control signal is transmitted by the accessory timer in response to a first actuation of the control actuator of the accessory timer, the second control signal in response to a second actuation of the control actuator of the accessory timer, and the third control signal in response to a third actuation of the control actuator.

19. The timer system of claim 18, wherein the third actuation comprises a double tap of the control actuator of the accessory timer.

20. A multiple location electronic timer system for controlling the power delivered to an electrical load from an AC power source, the system comprising:

a wall-mountable electronic timer adapted to be coupled in series electrical connection between the source and the load, such that the electronic timer is operable to enable the delivery of power to the load, and subsequently to prevent the delivery of power to the load automatically when a preset timeout period has elapsed; and a wall-mountable accessory timer, the electronic timer operable to control the power delivered to the load in response to a control signal received directly from the accessory timer;

wherein the electronic timer comprises a plurality of visual indicators operable to display a representation of the preset timeout period when the electronic timer is preventing the delivery of power to the load.

21. A multiple location electronic timer system for controlling the power delivered to an electrical load from an AC power source, the system comprising:

an electronic timer adapted to be coupled in series electrical connection between the source and the load, the electronic timer comprising an internal timer; and a wall-mountable accessory timer comprising a control actuator, a timer adjustment actuator, and a plurality of visual indicators;

wherein the electronic timer is operable to:

select a preset timeout period in response to an actuation of the timer adjustment actuator;

cause the visual indicators to display a representation of the preset timeout period;

enable the delivery of power to the load in response to an actuation of the control actuator;

start the internal timer in response to the actuation of the control actuator, the internal timer initialized with the preset timeout period; and prevent the delivery of power to the load when the preset timeout period has elapsed.

22. The timer system of claim 21, wherein the accessory timer is operable to transmit a control signal to the electronic timer.

23. The timer system of claim 22, wherein the electronic timer is operable to adjust the preset timeout period in response to the control signal received from the accessory timer.

24. The timer system of claim 23, wherein the accessory timer is operable to transmit the control signal in response to an actuation of the timer adjustment actuator.

25. The timer system of claim 22, wherein the electronic timer is operable to enter a bypass mode in response to the control signal received from the accessory timer, whereby the load is turned on for an indefinite amount of time.

26. The timer system of claim 25, wherein the accessory timer is operable to transmit the control signal in response to an actuation of the control actuator.

27. The timer system of claim 21, wherein the accessory timer is operable to receive a control signal from the electronic timer.

28. The timer system of claim 27, wherein the accessory timer is operable to cause the visual indicators to display a representation of the amount of time left until the preset timeout period elapses.

29. The timer system of claim 28, wherein the control signal is representative of the amount of time left until the preset timeout period elapses.

30. The timer system of claim 27, wherein the accessory timer is operable to cause the visual indicators to display a representation of the preset timeout period when the electronic timer is preventing the delivery of power to the load.

31. A wall-mountable load control device for controlling the power delivered to an electrical load from an AC power source, the load control device comprising:

a controllably conductive device adapted to be coupled in series electrical connection between the source and the load for controlling the delivery of power to the load, the controllably conductive device having a control input;

a controller operatively coupled to the control input of the controllably conductive device, the controller operable to control the conductivity of the controllably conductive device so as to enable the delivery of power to the load, and subsequently to control the conductivity of the controllably conductive device so as to prevent the delivery of power to the load automatically when a preset timeout period has elapsed;

a power supply coupled in parallel electrical connection with the controllably conductive device, the power supply operable to generate a DC voltage for powering the controller; and a communication circuit coupled to the controller and operable to receive a control signal, the controller operable to control the conductivity of the controllably conductive device in response to the control signal.

32. The load control device of claim 31, further comprising:

a plurality of visual indicators operatively coupled to the controller.

33. The load control device of claim 32, wherein the controller is operable to cause the visual indicators to display a representation of the amount of time left until the preset timeout period elapses.

34. The load control device of claim 33, wherein the controller is further operable to cause the communication circuit to transmit a second control signal representative of the amount of time left until the preset timeout period elapses.

35. The load control device of claim 32, wherein the visual indicators comprise a plurality of light-emitting diodes provided in a linear array.

36. The load control device of claim 32, wherein the controller is operable to cause the visual indicators to display a representation of the preset timeout period.

37. The load control device of claim 31, wherein the controller is further operable to select the preset timeout period in response to the control signal.

38. The load control device of claim 37, wherein the controller is further operable to cause the communication circuit to transmit a second control signal representative of the preset timeout period.

39. The load control device of claim 31, wherein the controller is further operable to cause the electronic timer to enter a bypass mode in response to the control signal, whereby the load is turned on for an indefinite amount of time in the bypass mode.

40. The load control device of claim 39, wherein the controller is further operable to control the conductivity of the controllably conductive device so as to enable the delivery of power to the load in response to the control signal, and to control the conductivity of the controllably conductive device so as to prevent the delivery of power to the load in response to the control signal.

41. The load control device of claim 31, wherein the control signal comprises a digital message, and the communication circuit is operable to communicate the digital messages via one of a radio frequency communication link, an infrared communication link, a power line carrier communication link, and a wired digital communication link.

42. The load control device of claim 31, wherein the controllably conductive device comprises a bidirectional semiconductor switch.

43. The load control device of claim 31, further comprising:
  a hot terminal adapted to be coupled to the source;
  a switched-hot terminal adapted to be coupled to the load, the controllably conductive device coupled between the hot terminal and the switched-hot terminal; and
  an accessory timer terminal coupled to the communication circuit adapted to receive of the control signal;
  wherein the communication circuit comprises a signal detector coupled to the accessory timer terminal and the controller, the signal detector operable to provide an indication to the controller that the control signal has been received, the signal detector operable to provide the indication to the controller that the control signal has been received in response to determining that current is flowing through the accessory timer terminal.

44. The load control device of claim 31, wherein the control signal comprises a current-carrier signal and the communication circuit comprises a current transformer having a primary winding coupled in series electrical connection between the AC power source and the electrical load, the current transformer having a secondary winding coupled to the controller, such that the controller is responsive to the current-carrier signal.

45. The load control device of claim 31, further comprising:
  a control actuator operatively coupled to the controller; and
  a timer adjustment actuator operatively coupled to the controller;
  wherein the controller is further operable to:
    select a preset timeout period in response to an actuation of the timer adjustment actuator;
    control the conductivity of the controllably conductive device so as to enable the delivery of power to the load in response to a first actuation of the control actuator; and
    control the conductivity of the controllably conductive device so as to prevent the delivery of power to the load in response to a second actuation of the control actuator.

46. The load control device of claim 31, wherein the controller comprises a timer and the controller is operable to initialize the timer with the preset timeout period, and to start the timer substantially concurrently with enabling of the delivery of power to the load.

47. A wall-mountable load control device for controlling the power delivered to an electrical load from an AC power source, the load control device comprising:
  a controllably conductive device adapted to be coupled in series electrical connection between the source and the load for controlling the delivery of power to the load, the controllably conductive device having a control input;
  a controller operatively coupled to the control input of the controllably conductive device, the controller operable to control the conductivity of the controllably conductive device so as to enable the delivery of power to the load, and subsequently control the conductivity of the controllably conductive device so as to prevent the delivery of power to the load when a preset timeout period has elapsed; and
  a communication circuit coupled to the controller and operable to receive a control signal, the controller further operable to:
    control the conductivity of the controllably conductive device so as to enable the delivery of power to the load in response to a first control signal;
    control the conductivity of the controllably conductive device so as to prevent the delivery of power to the load in response to a second control signal; and
    enter a bypass mode in response to a third control signal, whereby the load is turned on for an indefinite amount of time.

48. A wall-mountable load control device for controlling the power delivered to an electrical load from an AC power source, the load control device comprising:
  a controllably conductive device adapted to be coupled in series electrical connection between the source and the load for controlling the delivery of power to the load, the controllably conductive device having a control input;
  a controller operatively coupled to the control input of the controllably conductive device, the controller operable to control the conductivity of the controllably conductive device so as to enable the delivery of power to the load, and subsequently control the conductivity of the controllably conductive device so as to prevent the delivery of power to the load when a preset timeout period has elapsed; and
  a communication circuit coupled to the controller and operable to transmit a control signal representative of the preset timeout period.

49. A method of controlling the power delivered to an electrical load from an AC power source, the method comprising the steps of:
  actuating a timer adjustment actuator;
  transmitting a timer adjustment control signal in response to the step of actuating the timer adjustment actuator;
  receiving the timer adjustment control signal;

selecting a preset timeout period in response to the step of receiving the timer adjustment control signal;
enabling the delivery of power to the load; and
subsequently disabling the delivery of power to the load when the preset timeout period has elapsed.

50. The method of claim 49, further comprising the steps of:
actuating a control actuator; and
transmitting a toggle control signal in response to the step of actuating the control actuator.

51. The method of claim 50, further comprising the steps of:
receiving the toggle control signal; and
entering a bypass mode in response to the step of receiving the toggle control signal, whereby the load is turned on for an indefinite amount of time in the bypass mode.

52. The method of claim 51, wherein the step of actuating a control actuator comprises actuating the control actuator with two transitory actuations in quick succession.

53. The method of claim 50, further comprising the step of:
receiving the toggle control signal;
wherein the step of enabling the delivery of power to the load comprises enabling the delivery of power to the load in response to the step of receiving the toggle control signal.

54. The method of claim 50, further comprising the steps of:
receiving the toggle control signal; and
disabling the delivery of power to the load in response to the step of receiving the toggle control signal.

55. The method of claim 49, further comprising the steps of:
transmitting a second control signal representative of the preset timeout period;
receiving the second control signal; and
displaying a representation of the preset timeout period using a plurality of visual indicators in response to the step of receiving the second control signal.

56. The method of claim 49, further comprising the steps of:
transmitting a second control signal representative of the amount of time left until the step of disabling the delivery of power to the load when the preset timeout period has elapsed;
receiving the second control signal; and
using a plurality of visual indicators to display a representation of the amount of time left until the step of disabling the delivery of power to the load when the preset timeout period has elapsed in response to the step of receiving the second control signal.

57. The method of claim 49, further comprising the steps of:
initializing a timer with the preset timeout period; and
starting the timer substantially concurrently with the step of enabling the delivery of power to the load.

58. A method of controlling the power delivered to an electrical load from an AC power source, the method comprising the steps of:
receiving a first control signal;
enabling the delivery of power to the load in response to the first control signal;
subsequently discontinuing the delivery of power to the load when a preset timeout period has elapsed;
receiving a second control signal; and
entering a bypass mode in response to the second control signal, whereby the load is turned on for an indefinite amount of time in the bypass mode.

59. The method of claim 58, further comprising the steps of:
actuating a control actuator; and
prior to the step of receiving a first control signal, transmitting the first control signal in response to the step of actuating the control actuator.

60. The method of claim 58, further comprising the steps of:
actuating the control actuator with two transitory actuations in quick succession; and
prior to the step of receiving a second control signal, transmitting the second control signal in response to the step of actuating the control actuator with two transitory actuations in quick succession.

61. The method of claim 58, further comprising the steps of:
receiving a third control signal; and
disabling the delivery of power to the load in response to the step of receiving a third control signal.

62. The method of claim 58, further comprising the steps of:
actuating a timer adjustment actuator;
transmitting a timer adjustment control signal in response to the step of actuating the timer adjustment actuator;
receiving the timer adjustment control signal; and
selecting the preset timeout period in response to the step of receiving the timer adjustment control signal.

* * * * *